United States Patent
Williams et al.

(10) Patent No.: US 11,106,608 B1
(45) Date of Patent: Aug. 31, 2021

(54) SYNCHRONIZING ACCESS TO SHARED MEMORY BY EXTENDING PROTECTION FOR A TARGET ADDRESS OF A STORE-CONDITIONAL REQUEST

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Sanjeev Ghai, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/908,272

(22) Filed: Jun. 22, 2020

(51) Int. Cl.
*G06F 12/14* (2006.01)
*G06F 16/11* (2019.01)
(Continued)

(52) U.S. Cl.
CPC ...... *G06F 13/1668* (2013.01); *G06F 9/30043* (2013.01); *G06F 9/30101* (2013.01);
(Continued)

(58) Field of Classification Search
None
See application file for complete search history.

(56) References Cited

U.S. PATENT DOCUMENTS

| 5,193,167 | A | 3/1993 | Sites et al. |
| 5,611,074 | A | 3/1997 | Kantz et al. |

(Continued)

FOREIGN PATENT DOCUMENTS

WO  2017178925 A1  10/2017

OTHER PUBLICATIONS

Williams, et al., U.S. Appl. No. 16/172,413, filed Oct. 26, 2020, Non-Final Office Action dated Nov. 13, 2019.

(Continued)

*Primary Examiner* — Hyun Nam
(74) *Attorney, Agent, or Firm* — David M Quinn; Brian F. Russell

(57) ABSTRACT

A processing unit includes a processor core that executes a store-conditional instruction that generates a store-conditional request specifying a store target address. The processing unit further includes a reservation register that records shared memory addresses for which the processor core has obtained reservations and a cache that services the store-conditional request by conditionally updating the shared memory with the store data based on the reservation register indicating a reservation for the store target address. The cache includes a blocking state machine configured to protect the store target address against access by any conflicting memory access request snooped on a system interconnect during a protection window extension following servicing of the store-conditional request. The cache is configured to vary a duration of the protection window extension for different snooped memory access requests based on one of broadcast scopes and the relative locations of masters of the snooped memory access requests.

17 Claims, 14 Drawing Sheets

(51) Int. Cl.
*G06F 13/16* (2006.01)
*G06F 9/30* (2018.01)
*G06F 13/40* (2006.01)
*G06F 30/32* (2020.01)
*G06F 115/10* (2020.01)

(52) U.S. Cl.
CPC .......... *G06F 13/4027* (2013.01); *G06F 30/32* (2020.01); *G06F 2115/10* (2020.01)

(56) References Cited

U.S. PATENT DOCUMENTS

| | | |
|---|---|---|
| 5,706,464 A | 1/1998 | Moore et al. |
| 5,895,484 A | 4/1999 | Arimilli et al. |
| 5,895,495 A | 4/1999 | Arimilli et al. |
| 5,968,135 A | 10/1999 | Teramoto et al. |
| 6,067,603 A | 5/2000 | Carpenter et al. |
| 6,067,611 A | 5/2000 | Carpenter et al. |
| 6,081,874 A | 6/2000 | Carpenter et al. |
| 6,108,764 A | 8/2000 | Baumgartner et al. |
| 6,115,804 A | 9/2000 | Carpenter et al. |
| 6,122,674 A | 9/2000 | Olnowich |
| 6,338,122 B1 | 1/2002 | Baumgartner et al. |
| 6,546,429 B1 | 4/2003 | Baumgartner et al. |
| 6,549,989 B1 | 4/2003 | Arimilli et al. |
| 6,591,307 B1 | 7/2003 | Arimilli et al. |
| 6,611,872 B1 | 8/2003 | McCanne |
| 6,615,322 B2 | 9/2003 | Arimilli et al. |
| 6,622,189 B2 | 9/2003 | Bryant et al. |
| 6,625,701 B1* | 9/2003 | Arimilli ............... G06F 12/0811 711/141 |
| 6,629,209 B1 | 9/2003 | Arimilli et al. |
| 6,629,210 B1 | 9/2003 | Arimilli et al. |
| 6,629,212 B1 | 9/2003 | Arimilli et al. |
| 6,629,214 B1 | 9/2003 | Arimilli et al. |
| 6,633,959 B2 | 10/2003 | Arimilli et al. |
| 6,711,652 B2 | 3/2004 | Arimilli et al. |
| 6,725,358 B1 | 4/2004 | Moore |
| 6,748,501 B2 | 6/2004 | Arimilli et al. |
| 6,801,986 B2 | 10/2004 | Steely, Jr. et al. |
| 6,839,816 B2 | 1/2005 | Borkenhagen et al. |
| 7,127,561 B2 | 10/2006 | Hill et al. |
| 7,200,717 B2 | 4/2007 | Guthrie et al. |
| 7,228,385 B2 | 6/2007 | Guthrie et al. |
| 7,254,678 B2 | 8/2007 | Alexander et al. |
| 7,328,293 B2 | 2/2008 | Hammarlund et al. |
| 7,363,474 B2 | 4/2008 | Rodgers et al. |
| 7,444,494 B2 | 10/2008 | Goodman et al. |
| 7,480,771 B2 | 1/2009 | Moir et al. |
| 7,529,893 B2 | 5/2009 | Landin et al. |
| 7,620,954 B2 | 11/2009 | Mattina et al. |
| 7,818,388 B2 | 10/2010 | Arimillit et al. |
| 8,140,770 B2 | 3/2012 | Clark et al. |
| 8,521,963 B1 | 8/2013 | Miao et al. |
| 8,539,485 B2 | 9/2013 | Snyder et al. |
| 8,775,906 B2 | 7/2014 | Dodson et al. |
| 8,825,982 B2 | 9/2014 | Kultursay et al. |
| 8,949,539 B2 | 2/2015 | Blumrich et al. |
| 9,058,273 B1 | 6/2015 | Hollaway, Jr. et al. |
| 9,176,877 B2 | 11/2015 | Hollaway, Jr. et al. |
| 9,390,026 B2 | 7/2016 | Guthrie et al. |
| 9,396,127 B2 | 7/2016 | Guthrie et al. |
| 9,430,166 B2 | 8/2016 | Frey et al. |
| 9,465,670 B2 | 10/2016 | Grochowski et al. |
| 9,514,046 B1 | 12/2016 | Nowak et al. |
| 9,569,364 B1 | 2/2017 | Heyrman et al. |
| 2003/0009623 A1 | 1/2003 | Arimilli et al. |
| 2003/0033489 A1 | 2/2003 | Fujiyama |
| 2003/0041225 A1 | 2/2003 | Mattina et al. |
| 2003/0126379 A1 | 7/2003 | Kaushik et al. |
| 2003/0217115 A1 | 11/2003 | Rowlands |
| 2004/0073909 A1 | 4/2004 | Arimilli et al. |
| 2004/0230750 A1 | 11/2004 | Blake et al. |
| 2004/0236914 A1* | 11/2004 | Day ................... G06F 9/30087 711/152 |
| 2005/0160226 A1 | 7/2005 | Averill et al. |
| 2006/0085603 A1 | 4/2006 | Guthrie et al. |
| 2006/0179244 A1 | 8/2006 | Goodman et al. |
| 2006/0179253 A1 | 8/2006 | Fields, Jr. et al. |
| 2006/0200633 A1 | 9/2006 | Hosoe et al. |
| 2006/0271744 A1 | 11/2006 | Goodman et al. |
| 2007/0033345 A1* | 2/2007 | Guthrie ............... G06F 9/30072 711/122 |
| 2007/0124546 A1 | 5/2007 | Blanchard et al. |
| 2007/0150664 A1 | 6/2007 | Dombrowski et al. |
| 2007/0226427 A1 | 9/2007 | Guthrie et al. |
| 2008/0120625 A1 | 5/2008 | Clark et al. |
| 2008/0215824 A1 | 9/2008 | Goodman et al. |
| 2008/0294412 A1* | 11/2008 | Johns ................... G06F 9/30043 703/15 |
| 2009/0198695 A1 | 8/2009 | Arimilli et al. |
| 2009/0198918 A1 | 8/2009 | Arimilli et al. |
| 2009/0307660 A1* | 12/2009 | Srinivasan ............... G06F 8/314 717/114 |
| 2010/0235577 A1 | 9/2010 | Guthrie et al. |
| 2011/0047352 A1 | 2/2011 | Ganfield et al. |
| 2011/0161590 A1* | 6/2011 | Guthrie ................. G06F 9/3834 711/122 |
| 2011/0179082 A1 | 7/2011 | Vaghani et al. |
| 2012/0278431 A1 | 11/2012 | Luna |
| 2013/0205096 A1 | 8/2013 | Guthrie et al. |
| 2013/0205099 A1 | 8/2013 | Guthrie et al. |
| 2014/0115267 A1 | 4/2014 | Pierson et al. |
| 2014/0250276 A1 | 9/2014 | Blaner et al. |
| 2014/0310480 A1 | 10/2014 | Piry et al. |
| 2015/0052315 A1 | 2/2015 | Ghai et al. |
| 2015/0113226 A1 | 4/2015 | Accapadi et al. |
| 2015/0161054 A1* | 6/2015 | Ghai ................... G06F 12/0811 711/135 |
| 2015/0242327 A1 | 8/2015 | Guthrie et al. |
| 2016/0019063 A1 | 1/2016 | Rappoport et al. |
| 2016/0364332 A1 | 12/2016 | Nowak et al. |
| 2017/0031729 A1 | 2/2017 | Grochowski et al. |
| 2017/0293558 A1* | 10/2017 | Guthrie ............... G06F 12/0811 |
| 2018/0276046 A1 | 9/2018 | Joao et al. |
| 2020/0034312 A1* | 1/2020 | Williams ............ G06F 12/0868 |
| 2020/0142829 A1* | 5/2020 | Wang ................... G06F 12/0804 |
| 2020/0167284 A1* | 5/2020 | Jalal ..................... G06F 12/0815 |

OTHER PUBLICATIONS

Williams, et al., U.S. Appl. No. 16/172,413, filed Oct. 26, 2020, Final Office Action dated Apr. 7, 2020.

Williams, et al., U.S. Appl. No. 16/172,413, filed Oct. 26, 2020, Advisory Action dated Jun. 15, 2020.

Williams, et al., U.S. Appl. No. 16/172,413, filed Oct. 26, 2020, Non-Final Office Action dated Aug. 20, 2020.

Williams, et al., U.S. Appl. No. 16/172,413, filed Oct. 26, 2020, Notice of Allowance dated Dec. 7, 2021.

Williams et al, Application No. 16908272, Filing Date: Jun. 22, 2020—Appendix P.

Retter et al. U.S. Appl. No. 15/873,570, filed Jan. 17, 2018, Non-Flnal Office Action dated Jun. 26, 2019.

Retter et al. U.S. Appl. No. 15/873,515, filed Jan. 17, 2018, Notice of Allowance dated Apr. 4, 2019.

Williams et al. U.S. Appl. No. 16/216,659, filed Dec. 11, 2018 Non-Final Office Action dated May 14, 2020.

Williams et al. U.S. Appl. No. 16/184,522, filed Nov. 8, 2018, Non-Final Office Action dated Apr. 20, 2020.

Williams et al. U.S. Appl. No. 16/049,011, filed Jul. 30, 2018, Non-Final Office Action dated Dec. 23, 2019.

Williams et al. U.S. Appl. No. 16/049,011, filed Jul. 30, 2018, Notice of Allowance dated Mar. 18, 2020.

Guthrie et al. U.S. Appl. No. 15/873,366, filed Jan. 17, 2018, Non-Final Office Action dated Mar. 18, 2020.

Guthrie et al. U.S. Appl. No. 15/873,366, filed Jan. 17, 2018, Notice of Allowance dated Oct. 11, 2019.

(56) References Cited

OTHER PUBLICATIONS

Guthrie et al. U.S. Appl. No. 15/873,366, filed Jan. 17, 2018, Notice of Allowance dated Jan. 21, 2020.
Appendix P.

* cited by examiner

600 loop:
```
larx r1, var    —602
add  r1, 1      —604
stcx var, r1    —606
beq  loop       —608
```

FIG. 6A

610 loop:
```
load r1, lock   —620  ⎫
cmp  r1, 1      —622  ⎬ 612
beq  loop       —624  ⎭ larx r1, lock   —630  ⎫
cmp  r1, 1      —632  ⎪
beq  loop       —634  ⎪
li   r2, 1      —636  ⎬ 614
stcx lock, r2   —638  ⎪
beq  loop       —639  ⎭ barrier         —640  ⎫
...             —642  ⎪
(critical section    ⎬ 616
 instructions)       ⎪
...                  ⎪
barrier         —644  ⎭ li    r2, 0     —650  ⎫
store lock, r2  —652  ⎬ 618
                      ⎭
```

FIG. 6B

SYNCHRONIZING ACCESS TO SHARED MEMORY BY EXTENDING PROTECTION FOR A TARGET ADDRESS OF A STORE-CONDITIONAL REQUEST

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, a read-modify-write operation targeting shared memory can be emulated without the use of an atomic update primitive that strictly enforces atomicity.

BRIEF SUMMARY

In at least one embodiment, a data processing system includes multiple processing units all communicably coupled to a shared memory via a system interconnect. A processing unit includes a processor core that executes memory access instructions including a store-conditional instruction that generates a store-conditional request specifying a store target address and store data. The processing unit further includes a reservation register that records shared memory addresses for which the processor core has obtained reservations and a cache that services the store-conditional request by conditionally updating the shared memory with the store data based on the reservation register indicating a reservation for the store target address. The cache includes a blocking state machine configured to protect the store target address against access by any conflicting memory access request snooped on the system interconnect during a protection window extension following servicing of the store-conditional request. The cache is configured to vary a duration of the protection window extension for different snooped memory access requests based on one of broadcast scopes of the snooped memory access requests on the system interconnect and locations of masters of the snooped memory access requests relative to the processing unit.

BRIEF DESCRIPTION OF THE SEVERAL VIEWS OF THE DRAWINGS

FIG. 6A depicts a first exemplary instruction sequence that employs load-reserve and store-conditional instructions to synchronize access to shared memory;

FIG. 6B illustrates a second exemplary instruction sequence that employs load-reserve and store-conditional instructions to coordinate execution of a critical section of a multithreaded program;

DETAILED DESCRIPTION

Figure 1:
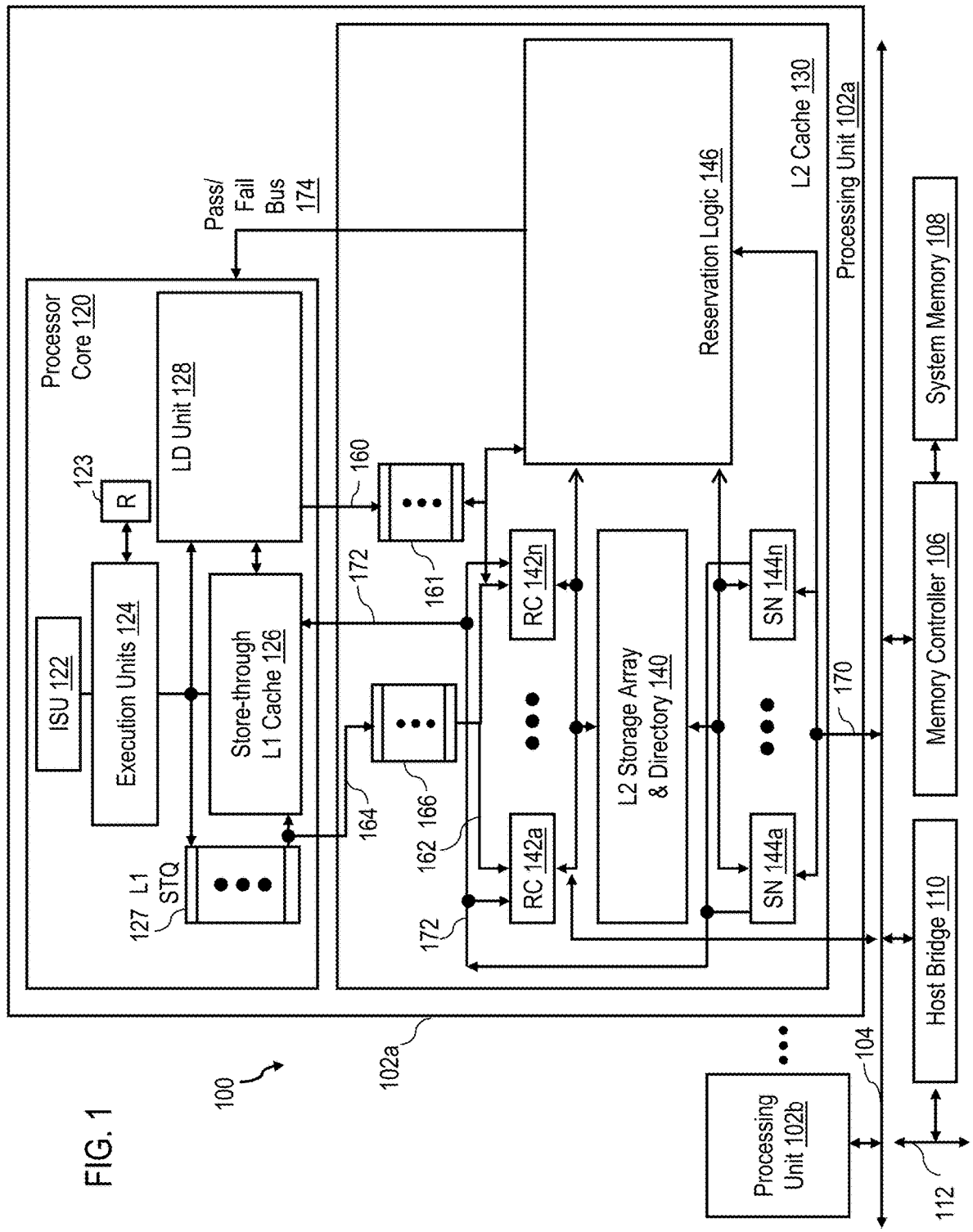
FIG. 1 is a high-level block diagram of an illustrative data processing system in accordance with one embodiment.

With reference now to the figures and in particular with reference to FIG. 1, there is illustrated a high-level block diagram of a data processing system 100 in accordance with one embodiment. As shown, data processing system 100 includes multiple (and possibly a multiplicity of) processing units 102 (including at least processing units 102a-102b) for processing data and instructions. As discussed below, these processing units 102 can be grouped in various ways. For example, in one hierarchically arranged system, disjoint collections of processing units 102 form processing nodes, disjoint collections of processing nodes form node groups, and the node groups together form the overall data processing system 100. Of course, in other examples, other groupings of processing units 102 may be implemented.

Processing units 102 are coupled for communication to a system interconnect 104 for conveying address, data and control information between attached devices. System interconnect 104 may comprise, for example, one or more bused interconnects, one or more switched interconnects, and/or one or more hybrid interconnects. In the depicted embodiment, the devices attached to system interconnect 104 include not only processing units 102, but also one or more memory controllers 106 each providing an interface to a respective one of shared system memories 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution, whether executing in the same processor core 120, a different processor core 120 in the same processing unit 102, or in a different processing unit 102. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store and load instructions (including load-reserve and store-conditional instructions). In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are initiated when the store request reaches the "bottom" or "commit" entry of L1 STQ 127.

It is important to note that the present application makes a distinction between "instructions", such as load-reserve and store-conditional instructions, and "requests." Load and store "instructions" (including load-reserve and store-conditional instructions) are defined herein as inputs to an execution unit that include an request code (opcode) identifying the type of instruction and one or more operands specifying data to be accessed and/or its address. Load and store "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level memory hierarchy having, at its lowest level, shared system memories 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1, L2 cache 130 contains a storage array and directory 140 that store cache lines of instructions and data in association with their respective memory addresses and coherence states. L2 cache 130 also includes a number of read-claim (RC) state machines 142a-142n for independently and concurrently servicing memory access requests received from the associated processor cores 120. RC machines 142 receive core load requests from LD unit 128 in processor core 120 via load bus 160, an in-order L2 load queue (LDQ) 161, and command bus 162. Similarly, RC machines 142 receive core store requests from L1 STQ 127 in processor core 120 via store bus 164, an in-order L2 store queue (STQ) 166, and command bus 162.

L2 cache 130 further includes a number of snoop (SN) state machines 144a-144n for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line to processor core 120.

It is important to note that in a preferred embodiment L2 cache 130 is constructed such that at most a single one of RC machines 142 and SN machines 144 can be active servicing a request targeting a given target cache line address at any one time. Consequently, if a second request is received while a first request targeting the same cache line is already being serviced by an active RC machine 142 or SN machine 144, the later-in-time second request must be queued or rejected until servicing of the first request is completed and the active state machine returns to an idle state.

L2 cache 130 finally includes reservation logic 146 for recording reservations of the associated processor core 120. Reservation logic 146 supplies pass and fail indications indicating the success or failure of store-conditional (STCX) requests to processor cores 120 via pass/fail bus 174. Exemplary embodiments of reservation logic 146 are described in greater detail below with reference to FIGS. 4A-4B.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Data processing system 100 of FIG. 1 is preferably implemented as a broadcast-based data processing system, which handles cache coherency through broadcast communication. As compared with systems of alternative architectures and like scale, broadcast-based systems tend to offer decreased access latency and better data handling and coherency management of shared memory blocks. However, as broadcast-based system scale up in size, traffic volume on the interconnect fabric is multiplied, meaning that system cost rises sharply with system scale as more bandwidth is required for communication over the interconnect fabric. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the coherence response latency of the furthest away lower level cache holding the requested memory block in a shared coherency state from which the requested data can be sourced.

In order to reduce traffic volume while still maintaining a broadcast-based coherency mechanism, preferred embodiments of the present invention implement multiple coherency domains within data processing system 100, where the coherency domains can conveniently be (but are not required to be) each implemented by a "processing node" formed of a collection of multiple processing units 102 disjoint from those forming each of the other processing nodes. For the purposes of the explaining exemplary operation of data processing system 100, it will hereafter be assumed that all such coherency domains have boundaries defined by sets of one or more processing nodes.

The implementation of coherency domains reduces system traffic by limiting inter-domain broadcast communication over system interconnect 104 in cases in which memory access requests can be serviced with participation by (and communication with) fewer than all coherency domains. For example, if the processing unit 102 of a given processing node has a READ request to issue, then the processing unit 102 may elect to first broadcast the READ request to all participants within its own coherency domain (e.g., processing node), but not to participants in other coherency domains. A broadcast operation transmitted to only those participants within the same coherency domain as the master/initiator of the operation is defined herein as a "nodal operation". If the READ request of nodal scope can be serviced within solely the coherency domain of the initiating processing unit 102, then no further broadcast of the READ request need be (or is) performed. If, however, the coherence responses to the READ request of nodal scope indicate that the READ request cannot be serviced solely within the local processing node of processing unit 102, the scope of the broadcast may then be extended to include, in addition to the coherency domain of the initiating processing unit 102, one or more additional coherency domain(s).

Figure 2:
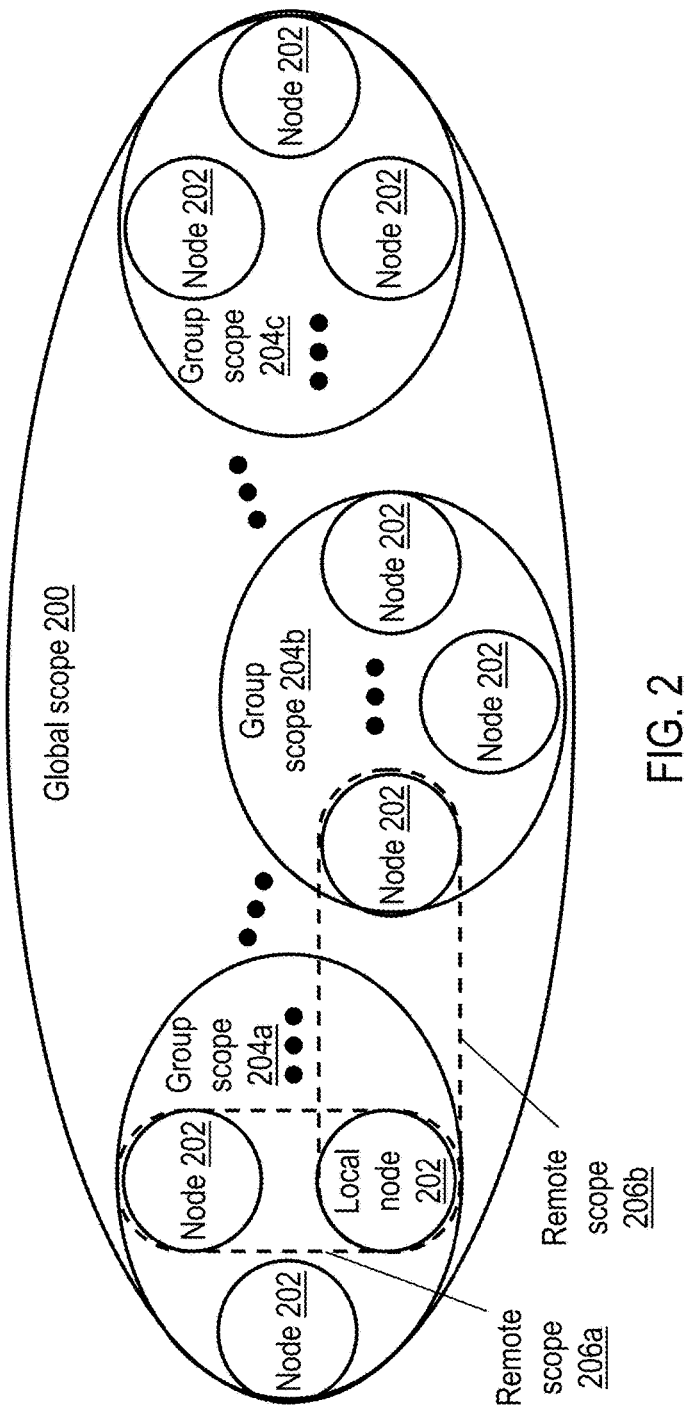
FIG. 2 depicts various scopes of broadcast of operations on the interconnect fabric of the data processing system of FIG. 1.

In basic implementations, only two broadcast scopes are employed: a "nodal" scope including only the coherency domain of the initiating master (e.g., a single processing node 202) and a "global" scope 200 including all of the coherency domains in the SMP data processing system, as shown in FIG. 2. Thus, an operation that is transmitted to all coherency domains in an SMP data processing system is defined herein as a "global operation". Of course, one or more supersets of the nodal broadcast scope can be defined intermediate the nodal scope and the global scope. For example, FIG. 2 illustrates an embodiment in which data processing system 100 optionally implements a plurality of node groups, where an operation broadcast from one processing node 202 to all processing nodes 202 within the node group defines an operation of "group" scope (e.g., one of group scopes 204a, 204b or 204c).

In some embodiments, the possible broadcast scopes for an operation can optionally include a "remote" scope, which is defined to include the coherency domain of the initiating master (e.g., its processing node 202) and a single other remote coherency domain (e.g., a remote processing node 202), while excluding at least one other peer coherency domain (e.g., a processing node 202 other than the processing node 202 including the initiating master and remote processing nodes 202). It should be noted that the coherency domain containing the initiating master, the remote coherency domain, and the peer coherency domain are non-overlapping in scope. For example, FIG. 2 explicitly illustrates two of the possible remote scopes for local processing node 202, which are identified as remote scope 206a and remote scope 206b, respectively.

In data processing systems 100 that are hierarchically arranged as shown, for example, in FIG. 2, the system interconnect 104, by virtue of the structure of its physical communication channels and/or the allocation of its available bandwidth among multiple different logical communication channels, may provide different bandwidth to requests of differing broadcast scopes. As one example, the broadcast of requests of nodal scope may be allocated the greatest bandwidth, the broadcast of requests of group scope may be allocated a lesser bandwidth, and the broadcast of requests of system scope may be allocated the least bandwidth.

Figure 3:
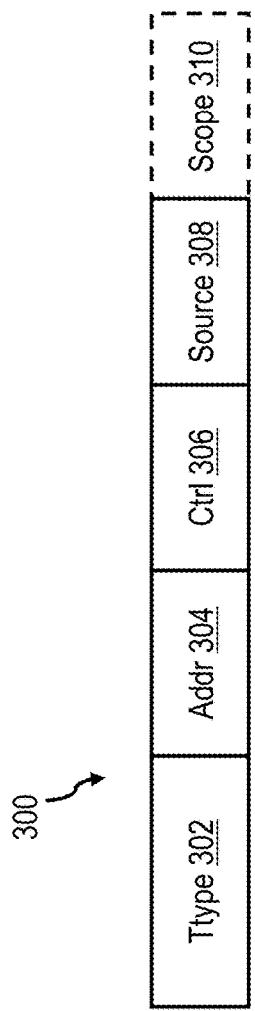
FIG. 3 illustrates an exemplary request on the interconnect fabric of the data processing system of FIG. 1.

With reference now to FIG. 3, there is illustrated an exemplary request 300 of an interconnect operation on the system interconnect 104 of a data processing system 100 implementing coherency domains as depicted in FIG. 2. In this example, request 300 includes a transaction type (ttype) field identifying the type of the request (e.g., a READ, etc.), an address field 304 specifying a target real address of request 300, and a control field 306 providing parameters of request 300 and/or its handling. In addition, in the illustrated embodiment, request 300 includes a source field 308 identifying which master initiated the request and, by implication, indicating the physical location of the master of request 300 within data processing system 100 in terms of the processing node 202 and the node group that contain the master. Request 300 additionally preferably provides at least one indication of its broadcast scope of (as well as that of the associated coherence messages). In some embodiments, this indication is simply implied by the physical and/or logical communication channel within system interconnect 104 that is utilized to broadcast request 300 . . . . In other embodiments, request 300 may alternatively or additionally indicate the broadcast scope of request 300 via a scope field 310, which indicates, for example, node scope, remote scope, group scope, or global scope. Based on the information provided by source field 308 and/or scope field 310, unillustrated forwarding logic within processing nodes 202 can determine whether or not to forward request 300 to one or more additional processing nodes 202 within data processing system 100 for processing.

Figure 4A:
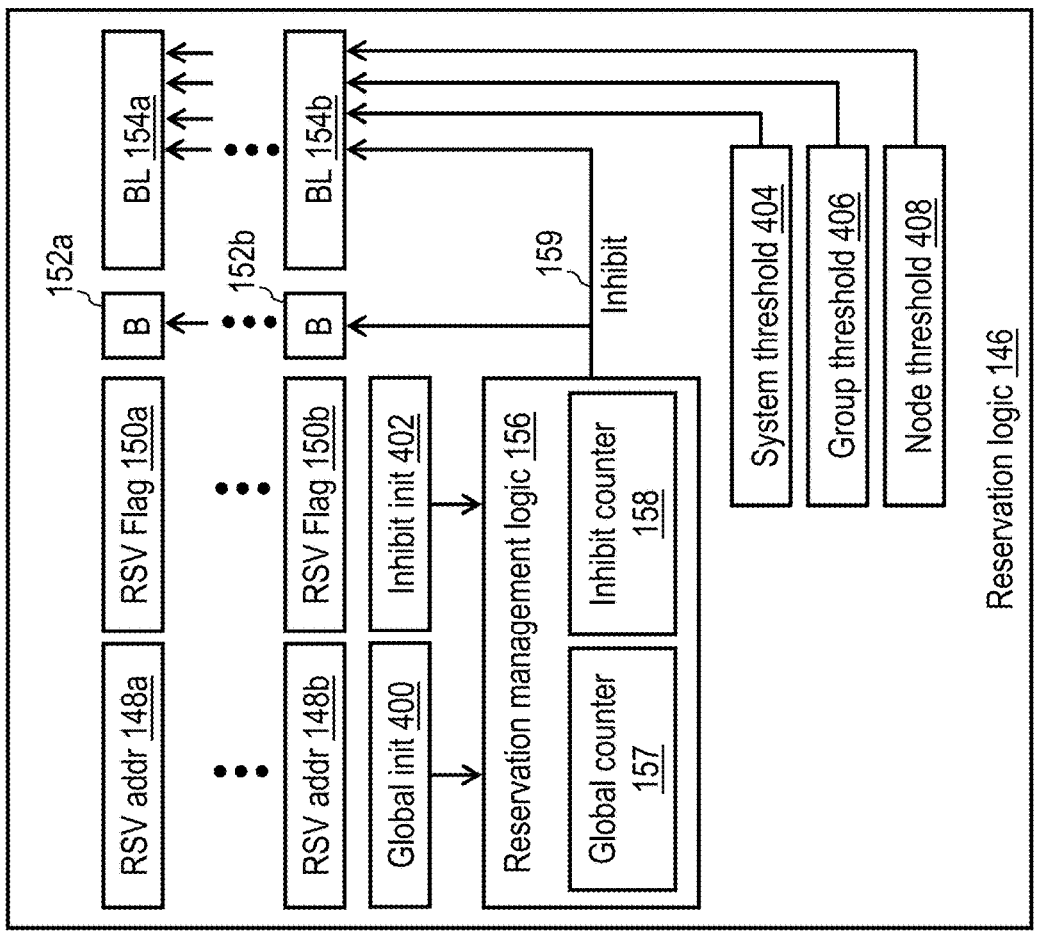
FIG. 4A is a more detailed view of the reservation logic of FIG. 1 in accordance with one embodiment.

Referring now to FIG. 4A, there is depicted a more detailed block diagram of reservation logic 146 of FIG. 1 in accordance with one embodiment. In the illustrated embodiment, reservation logic 146 includes, for each hardware thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148a and reservation flag 150a for thread 0 and reservation address field 148b and reservation flag 150b for thread 1. When set (e.g., to '1'), a reservation flag 150 indicates that the corresponding thread holds a reservation for the address contained in the associated reservation address field 148 and otherwise indicates no reservation is held.

Reservation logic 146 additionally includes per-thread blocking (B) flags 152a-152b and blocking (BL) state machines 154a-154b, as well as reservation management logic 156 that controls the setting of B flags 152 and the operation of BL state machines 154 via an inhibit signal 159. As described further below with reference to FIGS. 11 and 12, if not inhibited by the assertion of inhibit signal 159, each BL state machines 154 can extend the protection window applied to a respective store target address of a store-conditional (STCX) request to increase the likelihood that a subsequent local STCX request of the associated thread to the same store target address will succeed, even in the presence of contention between hardware threads for the store target address. In accordance with preferred embodiments, the duration of the protection window extension can be made dependent on the broadcast scope and/or the relative location of the master of the STCX request. For example, in exemplary embodiment in which data processing system 100 supports at least system, group, and node broadcast scopes for requests, the duration of the protection window extensions for requests of system, group, and node scopes of broadcast can be programmably specified by system threshold register 404, group threshold register 406, and node threshold register 408, respectively. In at least some embodiments, data processing system 100 sets the node threshold specified in node threshold register 408 to have the highest threshold value (corresponding to the protection window extension of the longest duration), the system threshold specified in system threshold register 404 to have the lowest threshold value (corresponding to a protection window extension of the shortest duration), and the group threshold specified in group threshold register 406 to have an intermediate threshold value (corresponding to a protection window extension of intermediate duration).

Reservation management logic 156 regulates the duration for which it will inhibit the BL state machines 154 of its processing unit 102 from providing extended protection of store target addresses of STCX requests by reference to an inhibit counter 158. The initial value of inhibit counter 158 can be specified by a programmable inhibit initial value ("inhibit init") register 402. Reservation management logic 156 regulates the duration for which it will permit the BL state machines 154 of its processing unit 102 to provide extended protection of store target addresses of STCX requests by reference to a global counter 157. The initial value of global counter 157 can be specified by a programmable global initial value ("global init") register 400. Generally, data processing system 100 configures the global initial value specified within global init register 400 to be greater than or equal to the largest of the three system/group/node threshold values specified by threshold registers 404-408. Any of the system/group/node threshold values that are configured to be equal to or greater than the global initial value will cause snooped requests of the corresponding class to not receive any preferential treatment (in terms of the early termination of the protection window extension) and to be subject to a protection window extension duration determined by the global initial value.

Figure 4B:
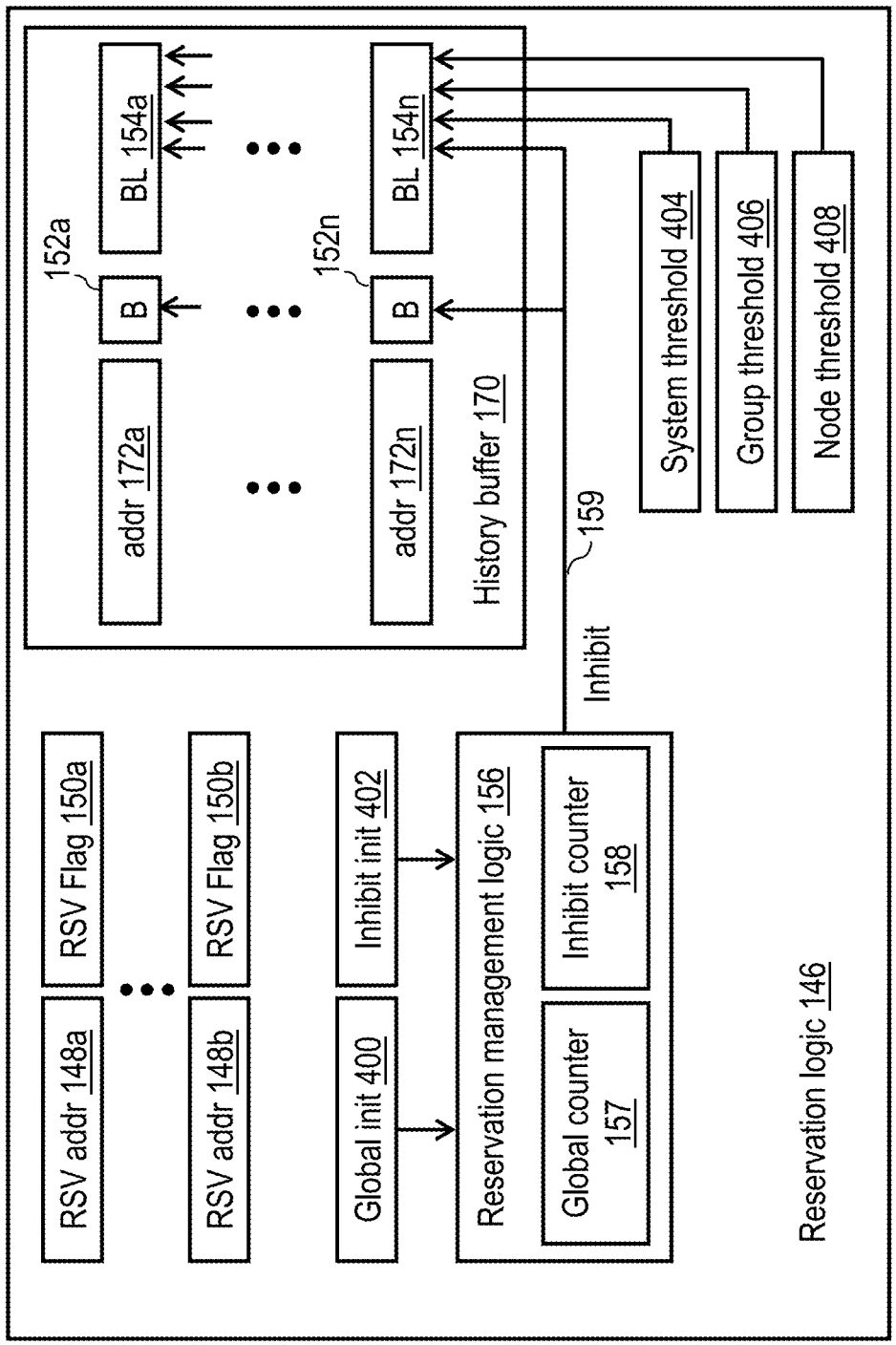
FIG. 4B is a more detailed view of the reservation logic of FIG. 1 in accordance with another embodiment.

FIG. 4B illustrates an alternative embodiment of reservation logic 146 that replaces the per-thread B flags 152 and BL state machines 154 in the embodiment of FIG. 4A with a history buffer 170. History buffer 170, if implemented, can be realized utilizing a variety of different data structures and can be managed utilizing a variety of different management policies. For example, in a first implementation, history buffer 170 can include one shadow register per thread that is loaded with the address specified in the associated thread's RSV address register 148 upon successful completion of a STCX request to that address. Each such shadow register has an associated B flag 152 and a BL state machine 154 as discussed above with reference to FIG. 4A. In a second implementation (shown in FIG. 4B), history buffer 170 can alternatively be realized as a N-deep FIFO buffer that stores that last N store target addresses of successful core STCX requests of any thread (regardless of duplication of store target addresses). In this implementation, each of the N entries of history buffer 170 includes an address register 172 for buffering the store target address of a successful STCX request transferred from one of RSV address registers 148a-148b, as well as a B flag 152 and a BL state machine 154 as discussed above with reference to FIG. 4A. In a third implementation, history buffer 170 can be realized as a FIFO buffer as in the second implementation, but additionally includes a comparator per entry to ensure that all store target addresses inserted into history buffer 170 are unique. Additional embodiments of and management policies for history buffer 170 will be apparent to those skilled in the art.

Figure 5:
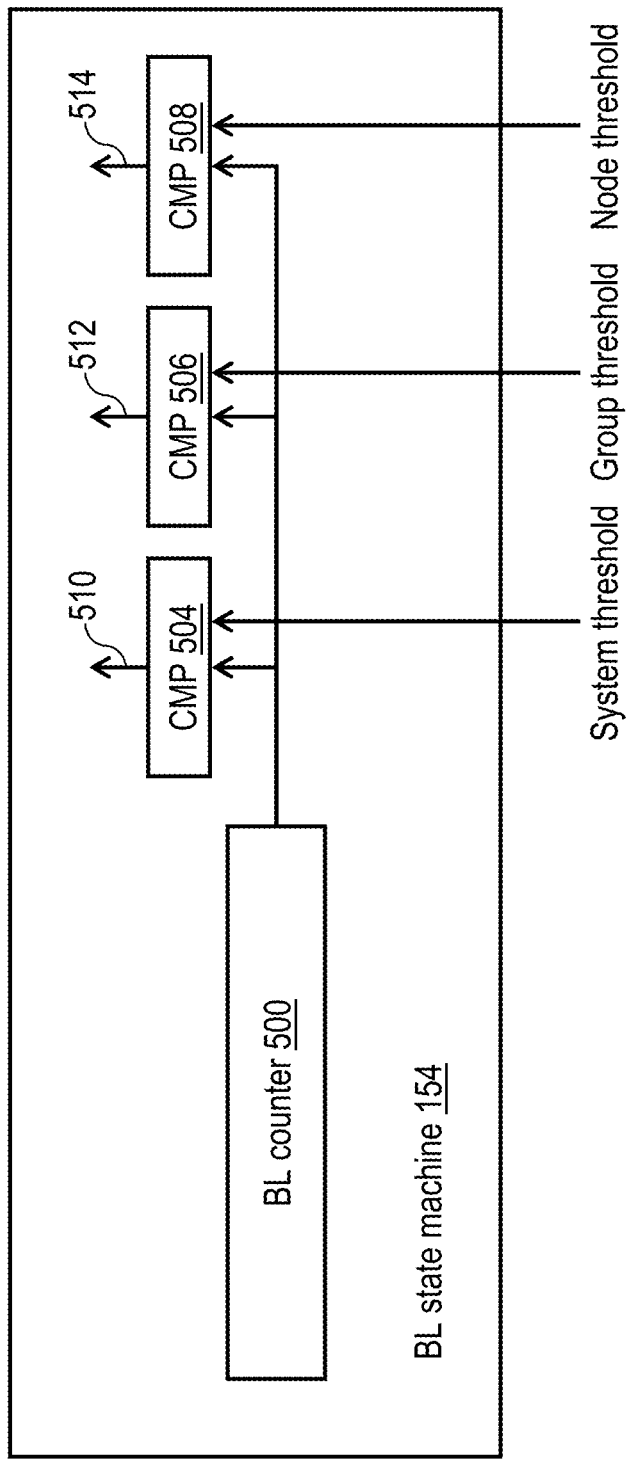
FIG. 5 illustrates an exemplary embodiment of the BL state machines of FIGS. 4A-4B.

With reference now to FIG. 5, there is illustrated an exemplary embodiment of the BL state machine 154 of FIGS. 4A-4B. In this example, BL state machine 154 comprises integrated circuitry including a BL counter 500 and associated comparators 504, 506, and 508. Comparators 504-508 each compare the BL counter value in BL counter 500 to a respective one of the system, group, and node threshold values specified in system threshold, group threshold, and node threshold counters 404-408. Based on detection by one of comparators 504-508 of a match of between the BL counter value and one of the scope threshold values, thus indicating that the corresponding threshold has been satisfied, the relevant one of comparators 504-508 asserts a respective one of match signals 510-514 to trigger an end to a protection window extension for the target address of a STCX request.

Referring now to FIG. 6A, there is depicted a first exemplary instruction sequence 600 that employs load-reserve and store-conditional instructions to synchronize access to shared memory. In particular, instruction sequence 600 is utilized to update the value of a variable in shared memory.

Instruction sequence 600 begins with a LARX instruction 602 that loads the value of the variable (i.e., var) from shared memory into a private register r1 in the processor core executing the instruction. The value of the variable is then updated locally in register r1, in this case, by an ADD instruction 604 incrementing the value of the variable by 1. The new value of the variable is then conditionally stored back into shared memory by STCX instruction 606. The success or failure of STCX instruction 606 in updating the value of the variable in shared memory is reflected in a condition code register (e.g., one of registers 123) in the processor core. Conditional branch instruction 608 then tests the condition code found in the condition code register and conditionally redirects execution based on the success or failure of STCX instruction 606. If the relevant bit(s) of the condition code register is/are equal to zero, indicating that the conditional update to the variable indicated by STCX instruction 606 failed (e.g., due to an intervening storage-modifying access to the variable by another thread between execution of LARX instruction 602 and STCX instruction 608), instruction sequence 600 will be repeated, and execution branches from conditional branch instruction 608 back to LARX instruction 602. If, however, the conditional update indicated by STCX instruction 606 succeeds, the condition code will be non-zero, and processing will continue with the next sequential instruction following instruction sequence 600.

With reference now to FIG. 6B, there is illustrated a second exemplary instruction sequence 610 that employs load-reserve and store-conditional instructions to coordinate execution of a critical section of a multithreaded program. As indicated, instruction sequence 610 includes, in program order, a polling instruction sequence 612, lock acquisition sequence 614, critical section 616, and lock release sequence 618.

As is known in the art, critical section 616 is, by definition, a portion of a program that includes accesses to a shared resource (e.g., a shared in-memory data set) that must not be concurrently accessed by more than one thread of the multiprocessor program. In order to keep the various hardware threads from making concurrent accesses to the shared resource, the multithreaded program bounds critical section 606 with barrier instructions 640, 644 that order execution of instructions within critical section 616 with respect to both instructions in the same thread that are outside critical section 616. In addition, the multiprocessor program ensures that not more than one thread at a time enters into a critical section by implementing a lock to which access is synchronized by load-reserve and store-conditional instructions.

In particular, a thread attempts to acquire the lock needed to enter critical section 616 through execution of lock acquisition sequence 614. Lock acquisition sequence 614 begins with a LARX instruction 630 that loads the value of the lock variable (i.e., lock) from shared memory into a private register r1 (e.g., one of registers 123) in the executing processor core. The value of the lock variable is then tested by compare instruction 632 to determine whether or not the lock is currently in a locked state (i.e., the lock is held by another thread). If so, conditional branch instruction 634 causes execution to return to the beginning of polling instruction sequence 612 (which is described in greater detail below). If a determination that the lock is not currently held by another thread, a LOAD immediate instruction 636 places a value of '1' (representing a locked state) into a register r2. A STCX instruction 638 then conditionally updates the lock variable in shared memory to the locked state, thus securing the lock for the executing thread. As before, the success or failure of the STCX instruction in updating the value of the lock variable in shared memory is reflected in a condition code register in the processor core. Conditional branch instruction 639 tests the condition code found in the condition code register and conditionally redirects execution based on the success or failure of STCX instruction 638. If the relevant bit(s) of the condition code register is/are equal to zero, indicating that the conditional update to the lock variable indicated by STCX instruction 638 failed (e.g., due to an intervening storage-modifying access to the lock variable by another thread between execution of LARX instruction 630 and STCX instruction 638), instruction sequence 610 will be repeated from the beginning of instruction polling sequence 612. If, however, the conditional update to the lock variable indicated by STCX instruction 638 succeeds, the condition code will be non-zero, and processing will proceed sequentially to critical section 616. Once critical section 616 completes, the thread will release the lock by updating the lock variable in shared memory by executing a lock release sequence 618 including a LOAD immediate instruction 650 that loads register r2 with a value of '0' (representing an unlocked state) and a STORE instruction 652 that updates the lock variable in shared memory with this value. Thereafter, execution of the thread proceeds to subsequent instructions, if any.

Although a multiprocessor program could be implemented with only lock acquisition sequence 614, critical section 616, and lock release sequence 618 (i.e., omitting polling instruction sequence 612), in practice such a multiprocessor program would not efficiently utilize the resources of a processing unit, such as a processing unit 102 in FIG. 1. In particular, LARX instruction 630, which is utilized to load the lock value and set the reservation for the lock address upon which the execution of STCX instruction 638 depends, is generally a resource-intensive instruction. Irrespective of the chosen implementation of the cache hierarchy, a LARX instruction requires communication with the coherence point of the cache hierarchy, and in implementations in which that the coherence point is not in the L1 cache, this communication results in the LARX instruction being more resource-intensive than a corresponding LOAD instruction. For example, in the current embodiment, regardless of whether the target address of LARX instruction 630 hits or misses in L1 cache 126, execution of LARX instruction 630 requires allocation of an entry in L2 LDQ 161, dispatch of an RC machine 142 in L2 cache 130, and update of reservation logic 146. Consequently, it is desirable that the thread iterate on a load target address using a less resource-intensive LOAD instruction rather than a more resource-intensive a LARX instruction.

Therefore, it is common for lock acquisition sequence 614 to be proceeded by a polling instruction sequence 612. Polling instruction sequence 612, which is constructed very similarly to the beginning of lock acquisition sequence 614, includes a polling LOAD instruction 620 (rather than a LARX instruction) that loads the lock value from shared memory, a compare instruction 622 that compares the lock value to a value of '1' (indicating a locked state), and a conditional branch instruction 624 that returns execution back to polling LOAD instruction 620 until the lock is found to be in the unlocked state. It is advantageous to employ polling LOAD instruction 620 to poll on the lock variable rather than a LARX instruction since a hit on the target address of polling LOAD instruction 620 in L1 cache 126 will not require utilization of any of the limited resources of L2 cache 130 (e.g., L2 LDQ 161, RC machines 142, and reservation logic 146).

In multithreaded programs that include instruction sequences such as instruction sequences 600 and 610, it is common for a hardware thread to execute multiple STCX instructions targeting the same store target address. For example, in the multithreaded program including instruction sequence 610, a hardware thread may need to acquire the same lock multiple times in order to execute various different critical sections of code. Because the target cache lines identified by STCX requests are commonly highly contended, it is not uncommon for these cache lines to bounce back and forth between the caches of various processing units, leading to significant traffic on the system interconnect and execution inefficiency due to the conditional updates to shared memory indicated by the STCX requests being attempted multiple times prior to succeeding. In accordance with the described inventions, synchronized access to shared memory is improved by extending the protection window for a store target address of a STCX request, thus increasing the probability that a subsequent local STCX request will succeed without having to obtain the target cache line from another processing unit.

Figure 7:
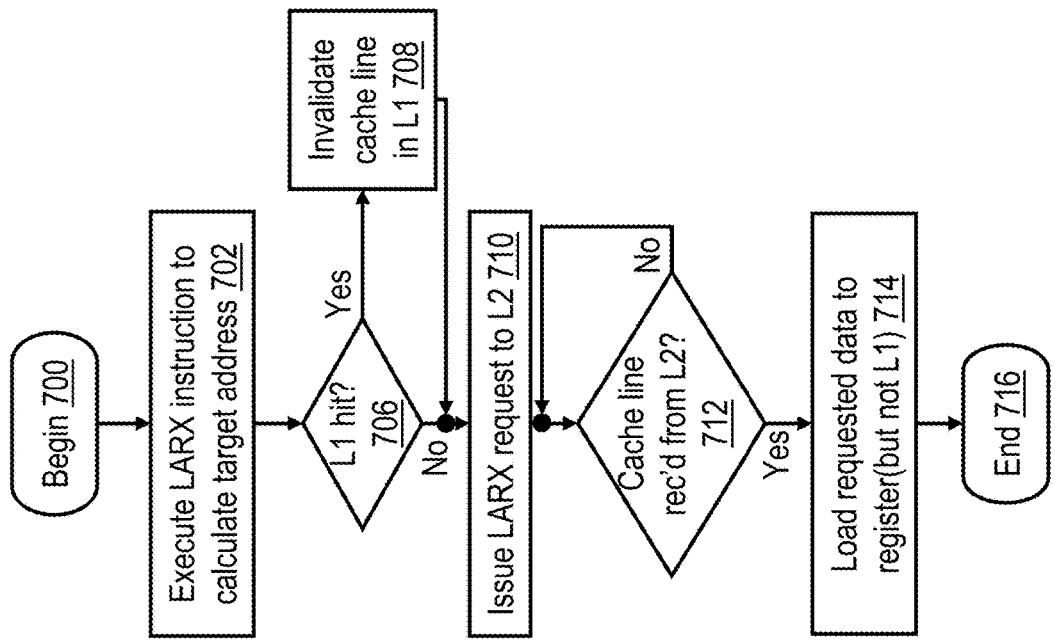
FIG. 7 is a high-level logical flowchart of an exemplary method of processing a load-reserve instruction in a processor core in accordance with one embodiment.

With reference now to FIG. 7, there is depicted a high-level logical flowchart of an exemplary method by which a processor core 120 of data processing system 100 processes a load-reserve (LARX) instruction in accordance with one embodiment. As shown, the process begins at block 700 and thereafter proceeds to block 702, which illustrates execution units 124 receiving a LARX instruction from ISU 122 and then executing the LARX instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the LARX instruction, an indication of the instruction type, a thread identifier, and the load target address calculated by execution of the LARX instruction are received from execution units 124 by LD unit 128. At block 706, LD unit 128 determines whether or not the load target address of the LARX instruction resides in L1 cache 126. If so, LD unit 128 invalidates the cache line containing the load target address in L1 cache 126 (block 708). Those skilled in the art should appreciate that the invalidation of the cache line containing the load target address in L1 cache 126 is a simplifying design choice and that in other embodiments the cache line containing the load target address need not be invalidated in L1 cache 126. Following block 708 or in response to determining that the load target address of the LARX instruction missed in L1 cache 126, LD unit 128 issues a LARX request to L2 cache 130 via load bus 160 (block 710). The LARX request includes, for example, an indication of the request type, the load target address, and an identifier of the issuing thread. After buffering the LARX request in L2 LDQ 161, L2 cache 130 dispatches the LARX request to an RC machine 142 for servicing, as described further below with reference to FIG. 8.

Next, at block 712, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 714). It should be appreciated that in an alternative embodiment that does not invalidate the requested cache line at block 708, the requested cache line can instead be cached in L1 cache 126 to permit subsequent loads (including subsequent load-reserve requests), to hit in L1 cache 126. Following block 714, the process of FIG. 7 terminates at block 716.

Figure 8:
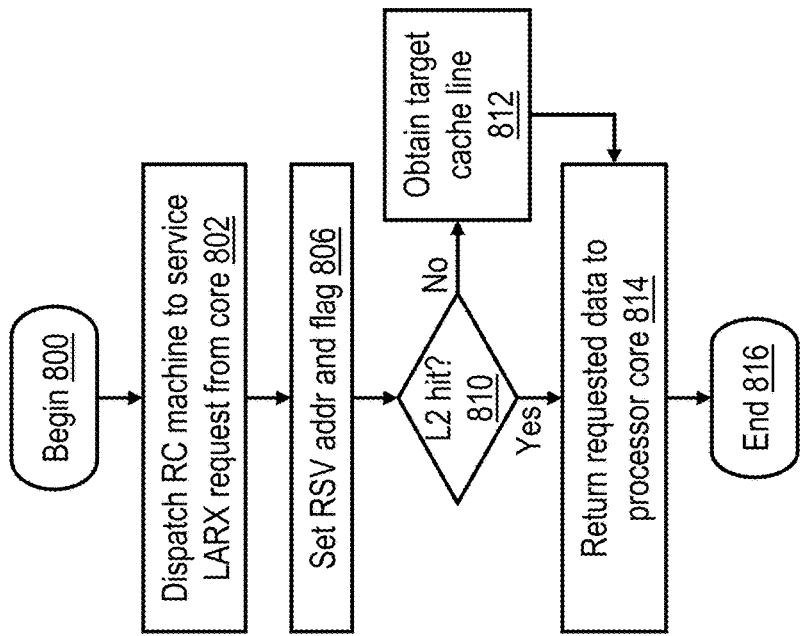
FIG. 8 is a high-level logical flowchart of an exemplary method of processing a load-reserve request in a lower level cache in accordance with one embodiment.

Referring now to FIG. 8, there is depicted a high-level logical flowchart of an exemplary method by which an L2 cache 130 of data processing system 100 processes a load-reserve (LARX) request in accordance with one embodiment. The process begins at block 800 and then proceeds to block 802, which depicts L2 cache 126 dispatching an RC machine 142 to service a next LARX request of the associated processor core 120 that is enqueued in L2 LDQ 161. As illustrated at block 806, RC machine 142 establishes a reservation for the load target address in L2 cache 130 in the reservation register of the appropriate thread by placing the load target address in the appropriate reservation address field 148 and setting the associated reservation flag 150.

At block 810, RC machine 142 additionally determines whether or not the load target address of the LARX request hit in L2 storage array and directory 140. If so, the process passes directly to block 814. If not, RC machine 142 issues one or more requests on system interconnect 104 in order to obtain a copy of the requested cache line from another cache hierarchy or system memory 108 (block 812). Following block 812, the process proceeds to block 814, which depicts RC machine 142 returning the requested cache line to the associated processor core 120. Thereafter, the RC machine 142 servicing the LARX request transitions from the busy state to the idle state, and the process of FIG. 8 ends at block 816.

Figure 9:
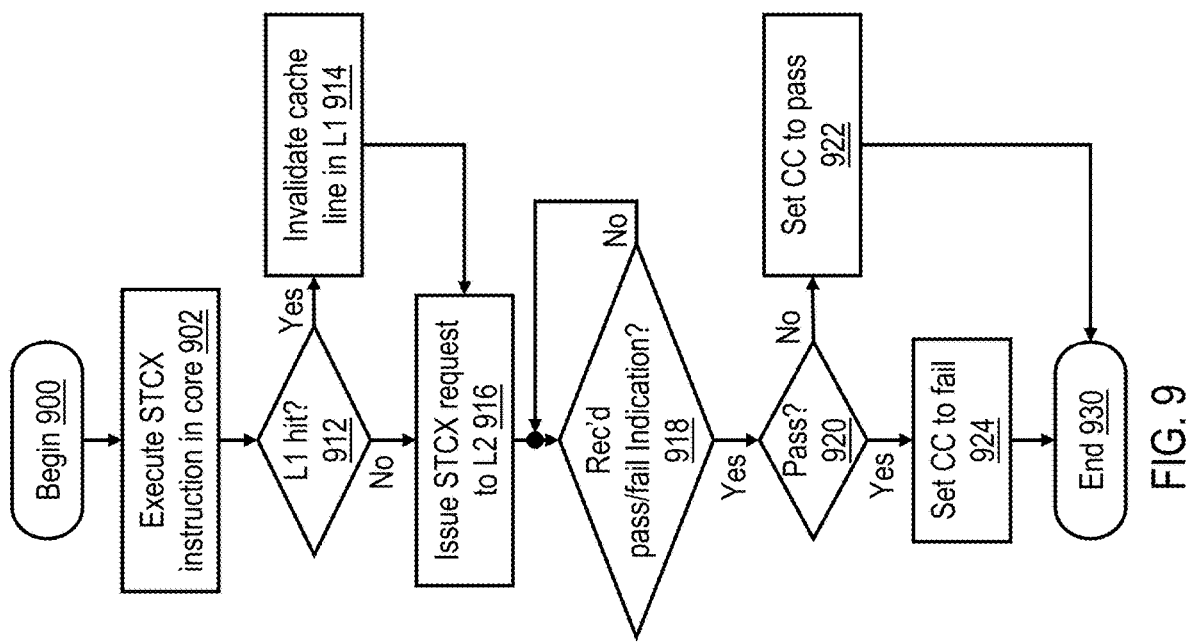
FIG. 9 is a high-level logical flowchart of an exemplary method of processing a store-conditional instruction in a processor core in accordance with one embodiment.

With reference now to FIG. 9, there is illustrated a high-level logical flowchart of an exemplary method of processing a store-conditional (STCX) instruction in a processor core in accordance with one embodiment. As depicted, the process begins at block 900 and thereafter proceeds to block 902, which illustrates execution units 124 receiving a STCX instruction from ISU 122 and then executing the store-type instruction to calculate a store target address. As with the LARX execution described above, execution units 124 also preferably execute STCX instructions appearing in the same hardware thread in-order and without pipelining with respect to both LARX and STCX instructions.

Upon execution of the STCX instruction, execution units 124 place a corresponding store-type request including the store target address calculated by execution of the STCX instruction, a thread identifier, and the store data specified by the operands of the STCX instruction within L1 STQ 127. In one preferred embodiment, L1 STQ 127 is implemented as a shared FIFO queue that buffers and orders store requests of all threads executing within processor unit 102. When the STCX request corresponding to the executed STCX instruction reaches the bottom or commit entry of L1 STQ 127, L1 STQ 127 determines at block 912 whether or not the store target address of the STCX request hits in L1 cache 126. If so, L1 STQ 127 invalidates the target cache line held in L1 cache 126 (block 914). Following block 914 or in response to the store target address missing in L1 cache 126 at block 912, L1 STQ 127 issues the STCX request to L2 STQ 166 of L2 cache 130 via store bus 164 (block 916). L1 STQ 127 then awaits return via pass/fail bus 174 of a pass or fail indication for the STCX request indicating whether or not the STCX request succeeded in updating L2 cache 130 (block 918). In response to receipt of the pass or fail indication via pass/fail bus 174, processor core 120 provides the pass or fail indication to execution units 124 (e.g., to indicate whether the path of execution should change) and, as shown at block 920-924, updates a condition code register among registers 123 to indicate whether the STCX request passed or failed. Thereafter, the STCX request is deallocated from L1 STQ 127, and the process of FIG. 9 terminates at block 930.

Figure 10:
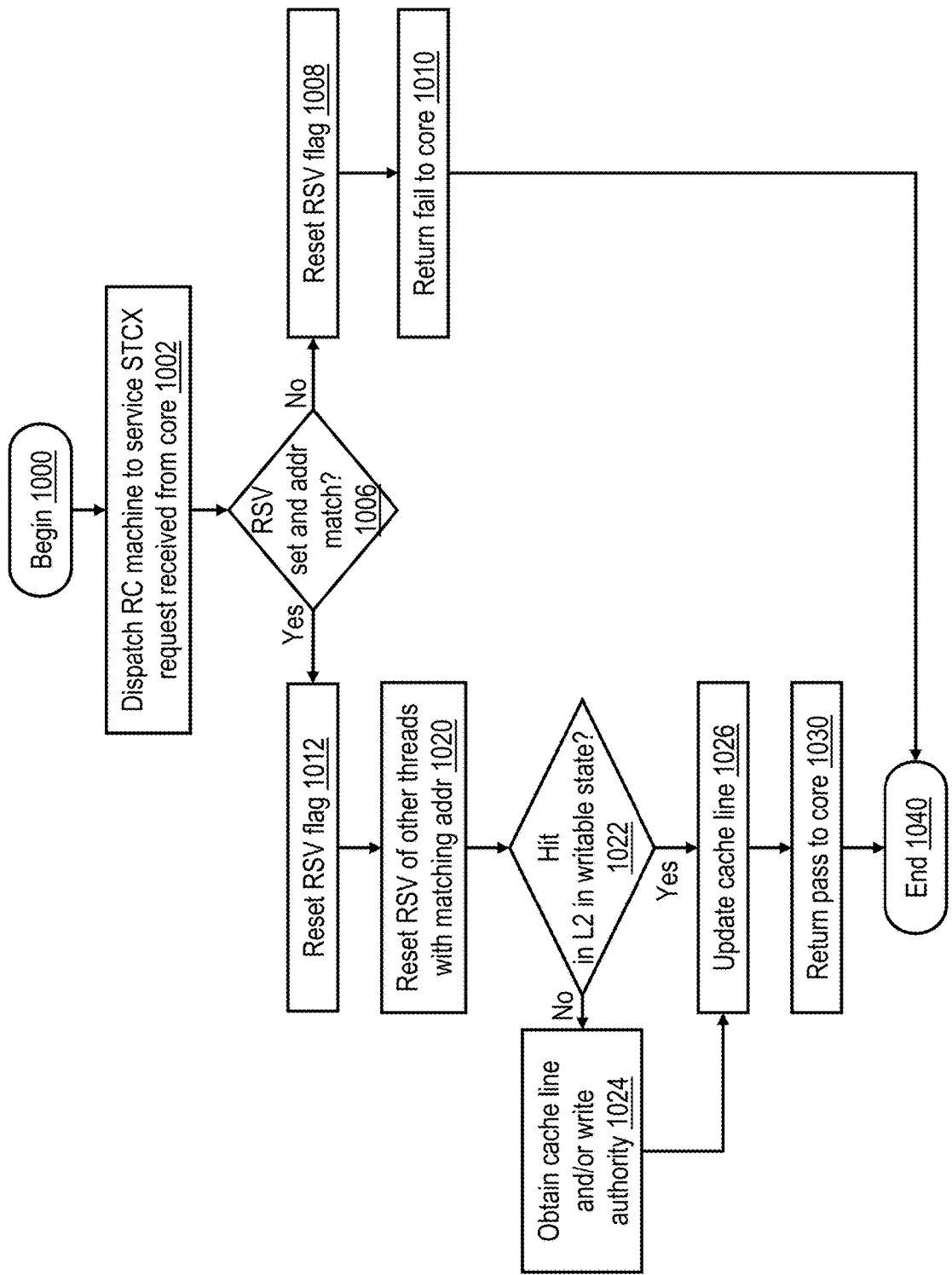
FIG. 10 is a high-level logical flowchart of an exemplary method of processing a store-conditional request in lower level cache in accordance with one embodiment.

Referring now to FIG. 10, there is depicted a high-level logical flowchart of an exemplary method of processing a store-conditional (STCX) request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 1000 in response to receipt of a store-type request in the bottom entry of L2 STQ 166. The store request at the bottom entry of L2 STQ 166 will then be selected for dispatch to an idle RC machine 142 for processing, as shown at block 1002.

In response to receipt of a STCX request for servicing, the dispatched RC machine 142 transitions from an idle state to the busy state. While in the busy state, the RC machine 142 protects the store target address of the STCX request against any conflicting access to the same store target address executing on another hardware thread of the same processing unit 102 or a different processing unit 102. The process of FIG. 10 proceeds from block 1002 to block 1006, which illustrates the RC machine 142 determining whether or not the issuing thread has a valid reservation for the store target address by determining whether the thread's RSV flag 150 is set and the associated RSV register 148 specifies a reservation address matching the store target address. If not, RC machine 342 resets the RSV flag 150 of the issuing thread (block 1008) and returns a fail indication to the processor core 120 via pass/fail bus 174 to report that the STCX request made no update to L2 cache 130 (block 1010). Thereafter, the RC machine 142 allocated to service the STCX request returns to the idle state, and the process of FIG. 10 ends at block 1040.

Returning to block 1006, in response to RC machine 142 determining that the issuing thread has a valid reservation for the store target address of the STCX request, RC machine 142 resets the issuing thread's RSV flag 150 (block 1012), as well as the RSV flag 150 of any other thread specifying a matching store target address in its associated RSV address register 148 (block 1020). It should be noted that in this exemplary embodiment a STCX request only cancels the reservations of other threads at block 1020 after it is verified at block 1006 that the STCX is going to succeed in its conditional update of shared memory.

The process proceeds from block 1020 to block 1022, which illustrates RC machine 142 determining whether or not the store target address of the STCX request hits in L2 storage array and directory 140 in a "writeable" coherence state that confers authority on L2 cache 130 to modify the target cache line. If not, RC machine 142 obtains authority to modify the target cache line and, if necessary, a copy of the target cache line from another cache hierarchy or memory controller 106 by issuing one or more requests on system interconnect 104 (block 1024). Following block 1024 or in response to an affirmative determination at block 1022, RC machine 142 updates the target cache line in L2 storage array and directory 140 with the store data of the store-type request (block 1026). RC machine 142 additionally returns a pass indication to processor core 120 via pass/fail bus 174 to report successful update of the L2 cache 130 (block 1030). Thereafter, RC machine 142 returns to the idle state, and the process of FIG. 10 ends at block 1040.

Figure 11:
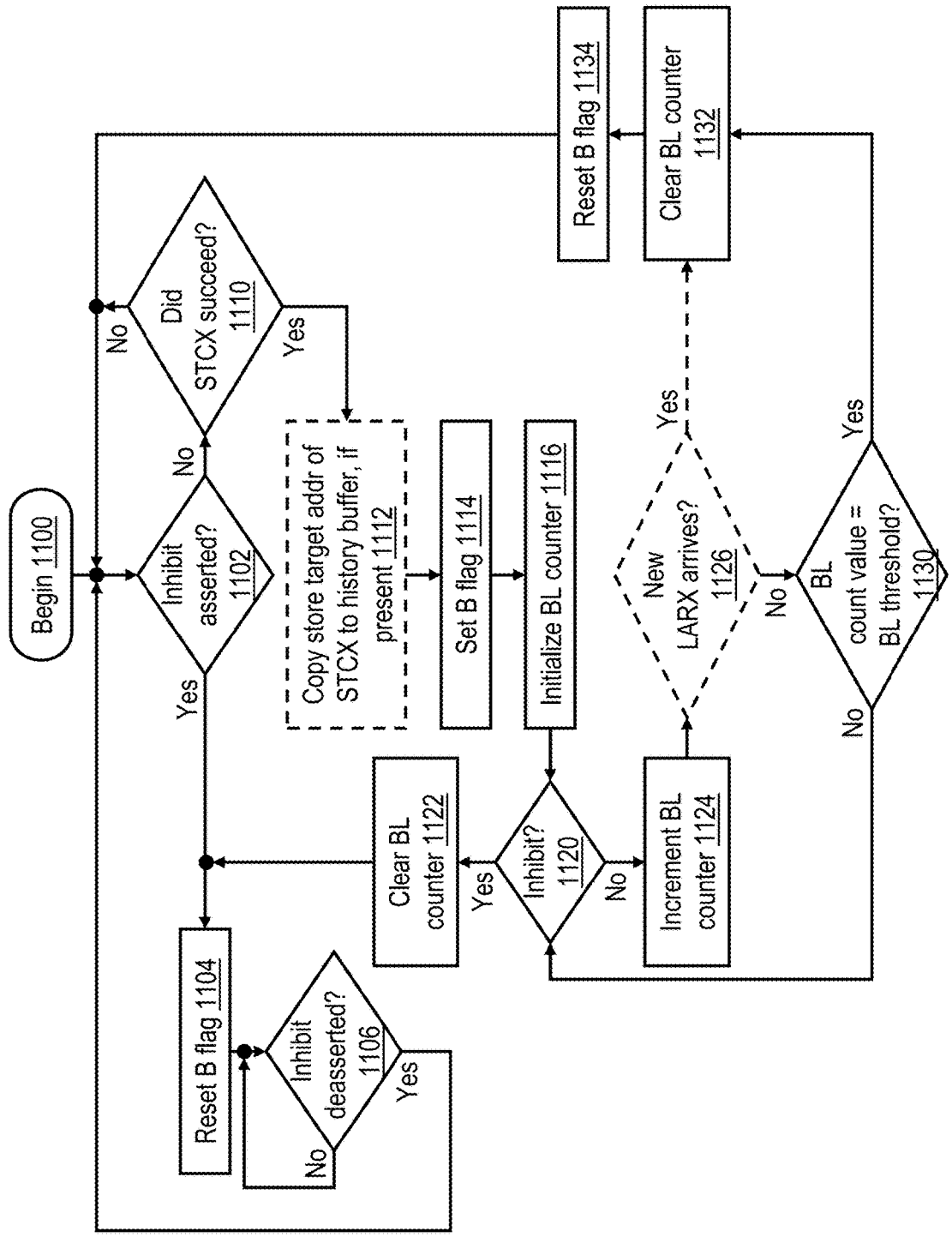
FIG. 11 is a high-level logical flowchart of an exemplary method by which the protection window associated with the target address of a store-conditional request is extended in accordance with one embodiment.

With reference to FIG. 11, there is illustrated a high-level logical flowchart of a method by which the protection window associated with the target address of a store-conditional (STCX) request is extended in accordance with one embodiment. The illustrated process can be performed, for example, by reservation logic 146 of FIG. 4A or FIG. 4B, in order to extend the protection window beyond that enforced by an RC machine 142 in accordance with the process of FIG. 10.

Figure 12:
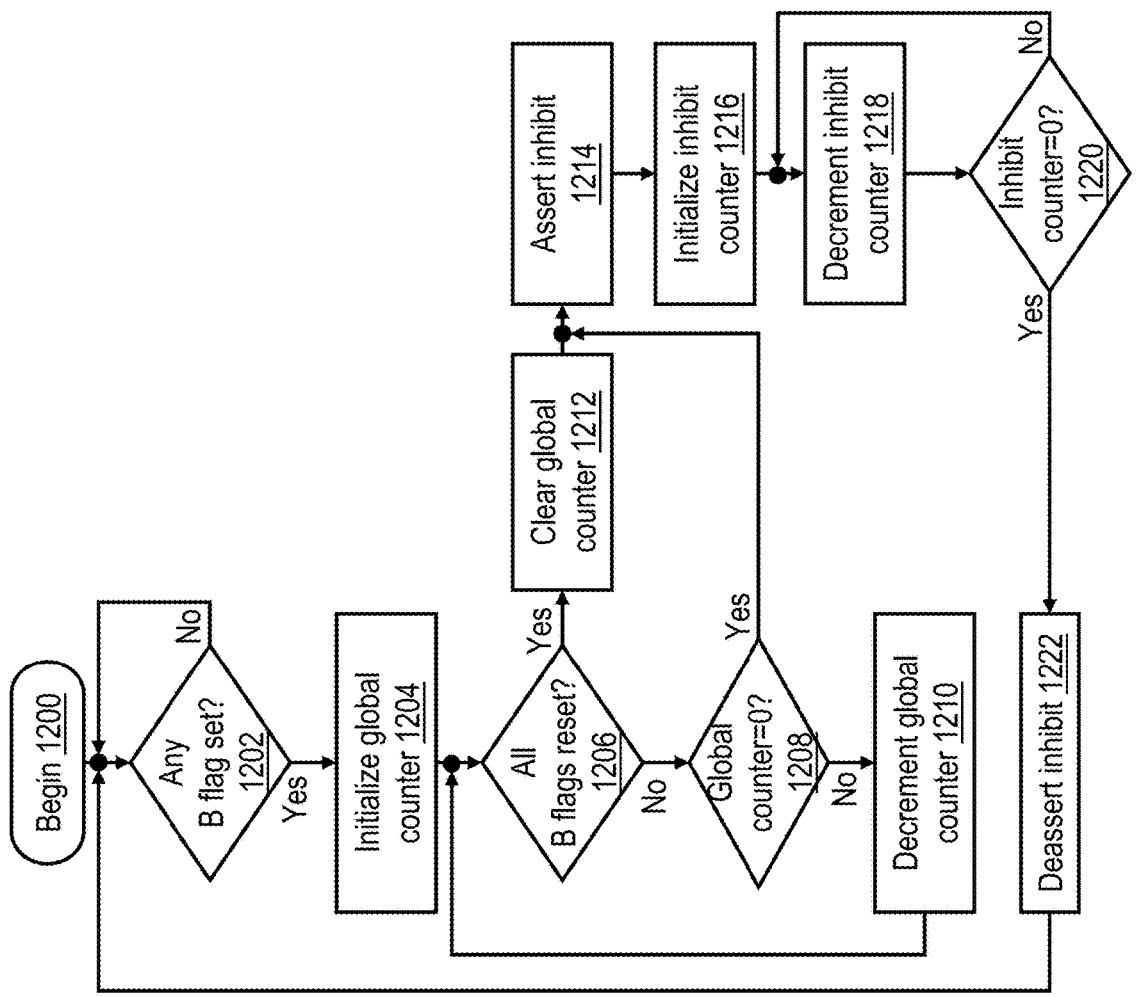
FIG. 12 is a high-level logical flowchart of an exemplary method of controlling the ability of a processing unit to extend the protection windows associated with target addresses of store-conditional requests in accordance with one embodiment.

The process of FIG. 11 begins at block 1100 and then proceeds to block 1102, which illustrates a determination of whether or not inhibit signal 159 is asserted by reservation management logic 156 (i.e., whether or not inhibit signal 159 is active). When asserted, inhibit signal 159 inhibits extension of the protection window of any store target address by any BL state machine 154, thus allowing the hardware threads executing on other processing units 102 a greater opportunity to access and update target cache lines for which contention may exist. FIG. 12, which is described below, discloses one embodiment of how reservation management logic 156 determines the timing and duration of assertion of inhibit signal 159.

If a determination is made at block 1102 that inhibit signal 159 is asserted, reservation logic 146 resets each B flag 152, if needed, as shown at block 1104. Reservation logic 146 then awaits deassertion of inhibit signal 159 at block 1106. In response to deassertion of inhibit signal 159, the process of FIG. 11 returns to block 1102, which has been described.

If reservation logic 146 determines at block 1102 that inhibit signal 159 is not asserted, meaning that reservation logic 146 is permitted to extend the protection windows applied to the store target addresses of STCX requests, reservation logic 146 determines at block 1110 whether or not a local STCX request succeeded in updating shared memory, as discussed above with respect to block 1030 of FIG. 10. If not, the process returns to block 1102. In response to a local STCX request succeeding, the process of FIG. 11 proceeds from block 1110 to block 1112 (in embodiments like FIG. 4B in which a history buffer 1110 is implemented) or block 1114 (in embodiments like FIG. 4A in which a history buffer 1110 is not implemented).

Block 1112 illustrates reservation logic 146 copying the store target address of the successful STCX request from the relevant RSV address register 148 to an address register 172 of history buffer 170, if present. At block 1114, reservation logic 146 sets the B flag 152 associated with the RSV address register 148 holding the store target address of the successful STCX request (in the embodiment of FIG. 4A) or the B flag 152 associated with the address register 172 holding the store target address of the successful STCX request (in the embodiment of FIG. 4B). Setting the B flag 152 at block 1114 initiates transition of the associated BL state machine 154 from the idle to the active state, thus protecting the associated store target address from access by other hardware threads of the same or a different processing unit 102.

At block 1116, the BL state machine 154 initializes its BL counter 500 (in this example, an ascending counter) to an initial count value (e.g., 0). The BL count value indicates the current duration of the extension of the protection window applied to the store target address following the conclusion of the protection provided by the RC machine 142 in the process of FIG. 10. At block 1120, the BL state machine 154 determines whether inhibit signal 159 has been asserted. If so, the BL state machine 154 clears its BL counter 500, ends the protection window extension, and returns to the idle state (block 1122). Thereafter, the process of FIG. 11 passes to block 1104, which has been described.

Returning to block 1120, if inhibit signal 159 is not asserted, the BL state machine 154 increments BL counter 500 at regular intervals (block 1124). In embodiments including a history buffer 170, optional block 1126 is omitted, and the process passes directly from block 1124 to block 1130, which illustrates the BL state machine 154 checking to determine whether or not BL counter 500 has a counter value equal to a BL threshold value determining a maximum allowed duration of the protection window extension individually applied by BL state machine 154. If not, the process returns to block 1120, which has been described. If, however, BL state machine 154 determines at block 1130 that BL counter 500 has reached a count value that satisfies the maximum BL count threshold, the process proceeds from block 1130 to block 1132, which is described below.

Returning to optional block 1126, in embodiments omitting a history buffer 170, the busy BL state machine 154 may optionally determine whether L2 cache 130 has received a new LARX request from the associated processor core 120. If not, the process passes to block 1130; if, however, a new LARX request from the associated processor core 120, the process passes from block 1126 to block 1132-1134.

At blocks 1132-1134, the BL state machine 154 clears the BL counter 500 and resets its associated B flag 152, thus ending the protection window extension. The BL state machine 154 then returns to the idle state. Thereafter, the process of FIG. 11 passes to block 1102, which has been described.

Referring now to FIG. 12, there is depicted a high-level logical flowchart of an exemplary method of controlling the ability of a processing unit to extend the protection windows associated with target addresses of store-conditional requests in accordance with one embodiment. The process given in FIG. 12 can be performed, for example, by reservation management logic 156.

The process of FIG. 12 begins at block 1200 and then proceeds to block 1202, which illustrates reservation management logic 156 determining whether or not any B flag 152 is set. If not, the process simply iterates at block 1202. In response to a determination at block 1202 that at least one B flag 152 is set, reservation management logic 156 initializes global counter 157 by setting it to a count value indicative of a maximum continuous duration for which the reservation logic 146 of the local processing unit 102 is permitted to provide protection window extensions for the store target addresses of locally executed STCX requests.

As shown at blocks 1206-1208, the processing of reservation management logic 156 then enters a loop in which reservation management logic 156 monitors for the first to occur of two conditions: (1) all of all B flags 152 or 152 being reset, indicating that all active protection window extensions have now ended (as shown at block 1206) or (2) the count value of global counter 157 reaching zero (block 1208). In response to reservation management logic 156 determining at block 1206 that all B flags have been reset, reservation management logic 156 clears global counter 157 (block 1212), and the process passes to block 1214. If, however, reservation management logic 156 determines at block 1208 that global counter 157 has reached a count value of zero, the process passes directly to block 1214. If neither of these conditions is detected, reservation management logic 156 decrements global counter 157 (block 1210) and again makes the determinations depicted at blocks 1206-1208.

At block 1214, reservation management logic 156 asserts inhibit signal 159, which as discussed with reference to block 1102 of FIG. 11 prevents reservation logic 146 from extending the protection window provided for the storage target address of a local STCX request. Reservation management logic 1214 also initializes inhibit counter 158 to a count value reflecting a duration for which it will inhibit reservation logic 146 from extending the protection window provided for the storage target address of any local STCX request (block 1216). As indicated by blocks 1218 and 1220, reservation management logic 156 then iteratively decrements inhibit counter 158 until the period for inhibiting the extension of protection windows for the storage target address of any local STCX request has elapsed. In response to the elapse of this period, reservation management logic 156 deasserts inhibit signal 159 (block 1222), thus enabling reservation logic 146 to again apply protection window extensions for target addresses of locally generated STCX requests. Thereafter, the process returns to block 1202, which has been described.

Figure 13:
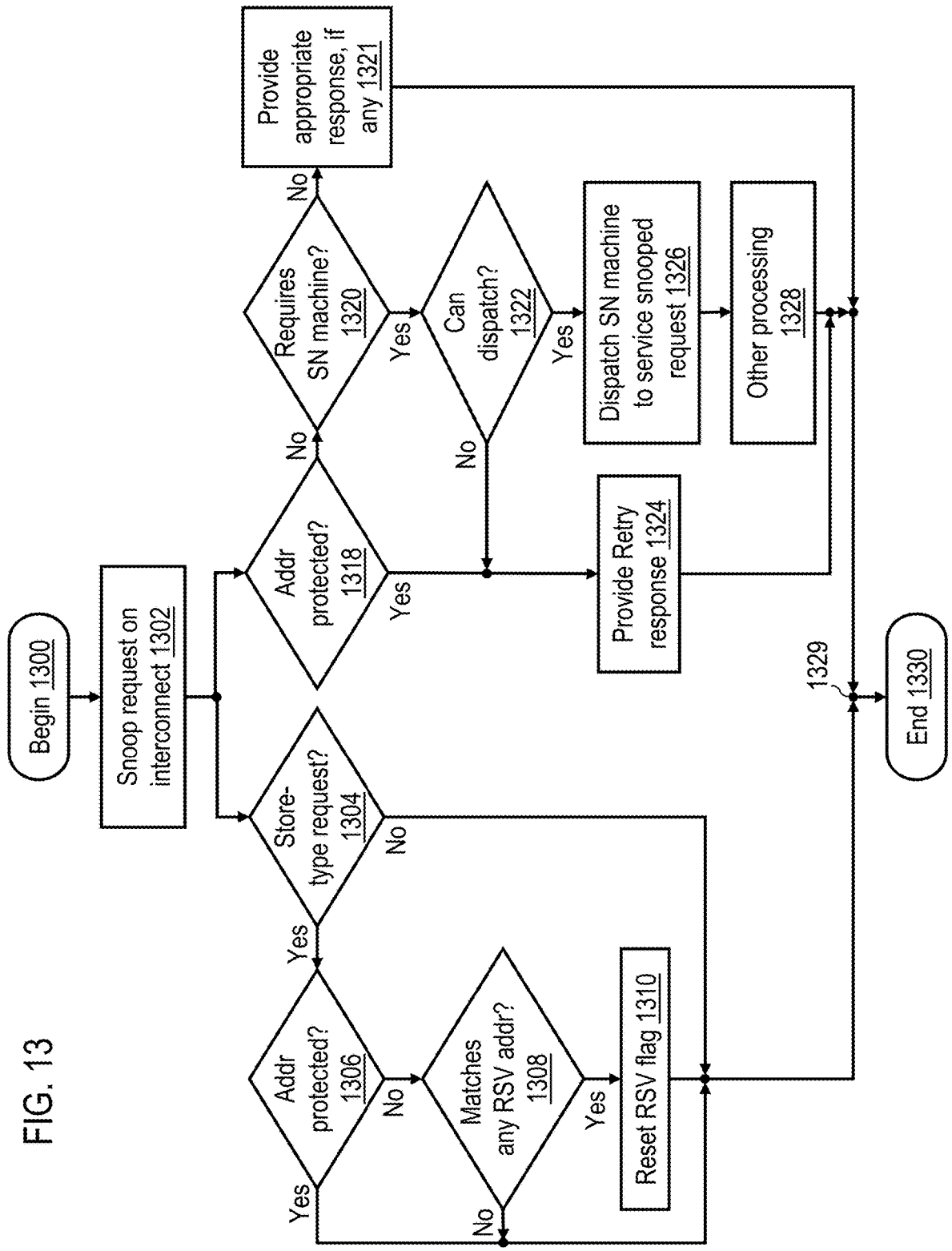
FIG. 13 is a high-level logical flowchart of an exemplary method of processing a snooped request in accordance with one embodiment.

With reference now to FIG. 13, there is illustrated a high-level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 1300 and thereafter proceeds to block 1302, which illustrates an L2 cache 130 snooping a request (e.g., issued by anther processing unit 102) on system interconnect 104 via snoop bus 170. Following block 1302, the process of FIG. 13 bifurcates into two concurrent parallel subprocesses—a reservation update subprocess depicted at blocks 1304-1310 in which the affect, if any, of the snooped request on pending reservations tracked in the L2 cache 130 is managed, and a request servicing subprocess at blocks 1318-1328 in which the snooped request is serviced by the snooping L2 cache 130, if necessary. Following completion of both subprocesses, the two subprocesses merge at join point 1329, and process of FIG. 13 ends at block 1330.

Referring first to the reservation update subprocess, the snooping L2 cache 130 determines at block 1304 whether or not the snooped request is a store-type request that modifies or requests authority to modify shared memory. If not, no update to any local reservation is required, and the reservation update subprocess proceeds to join point 1329. If, however, the snooped request is a store-type request that indicates the intention to modify a target cache line, L2 cache 130 additionally determines at block 1306 whether or not the store target address of the snooped store-type request is currently being protected by a protection window extension. An exemplary embodiment of a method for making the determination depicted at block 1306 is given in FIG. 14, which is described below. If so, the snooped request is not permitted to reset any local reservation associated with the store target address, and the reservation update subprocess proceeds to join point 1329. In response to a determination at block 1306 that the store target address of the snooped request is not being protected, L2 cache 130 resets the RSV flag 150 associated with any of its RSV address registers 148 that matches the store target address of the target cache line (blocks 1308-1310). Following either block 1308 or block 1310, the reservation update subprocess proceeds to join point 1329.

Referring now to the request servicing subprocess, L2 cache 130 determines at block 1318 whether or not the target address of the snooped request is currently being protected by a protection window extension. An exemplary method by which L2 cache 130 makes the determination depicted at block 1318 is described below with reference to FIG. 14. If so, L2 cache 130 provides a Retry coherence response, forcing the snooped request to be reissued by its source (block 1324). Thereafter, the reservation update subprocess proceeds to join point 1329. If, however, the target address of the snooped request is not currently being protected, L2 cache 130 determines at block 1320 whether or not servicing the snooped request requires allocation of a SN machine 144. If not, no SN machine 144 is dispatched to service the snooped request. The L2 cache 130 will nevertheless provide the appropriate coherence response, if any (block 1321), and the request servicing subprocess simply proceeds to join point 1329. If, however, L2 cache 130 determines at block 1320 that a SN machine 144 is required to service the snooped request, L2 cache 130 further determines at block 1322 whether or not a SN machine 144 can presently be dispatched. In order to dispatch a SN machine 144, a SN machine 144 must be available (i.e., in the idle state) and no RC machine 146 or SN machine 144 can be busy servicing a request having a target cache line address matching that specified by the snooped request (among other dispatch constraints). Thus, for example, an RC machine 146 allocated to service a STCX request will prevent the dispatch of a local SN machine 144 to service a snooped request specifying a conflicting (i.e., matching) target cache line address.

In response to a determination at block 1322 that a SN machine 144 cannot presently be dispatched to service the snooped request, L2 cache 130 provides a Retry coherence response on system interconnect 104 to indicate its present inability to service the snooped request (block 1324). (In response to this Retry coherence response, the source of the snooped request may later represent the request on system interconnect 104.) Following block 1324, the request servicing subprocess proceeds to join point 1329. If, however, L2 cache 130 determines at block 1322 that a SN machine 144 can presently be dispatched to service the snooped request, L2 cache 130 dispatches an idle SN machine 144 to service the snooped request (block 1326). The dispatched snoop machine 144 transitions from the idle state to the busy state and then performs at block 1328 whatever additional processing is required to service the snooped request (e.g., updating L2 storage array and directory 140 and/or L1 cache 110, sourcing a copy of the target cache line, providing protocol-dependent coherence responses, etc.). Following completion of its processing at block 1328, the SN machine 144 dispatched to service the snooped request transitions from the busy state to the idle state, and the request servicing subprocess proceeds to join point 1329.

Figure 14:
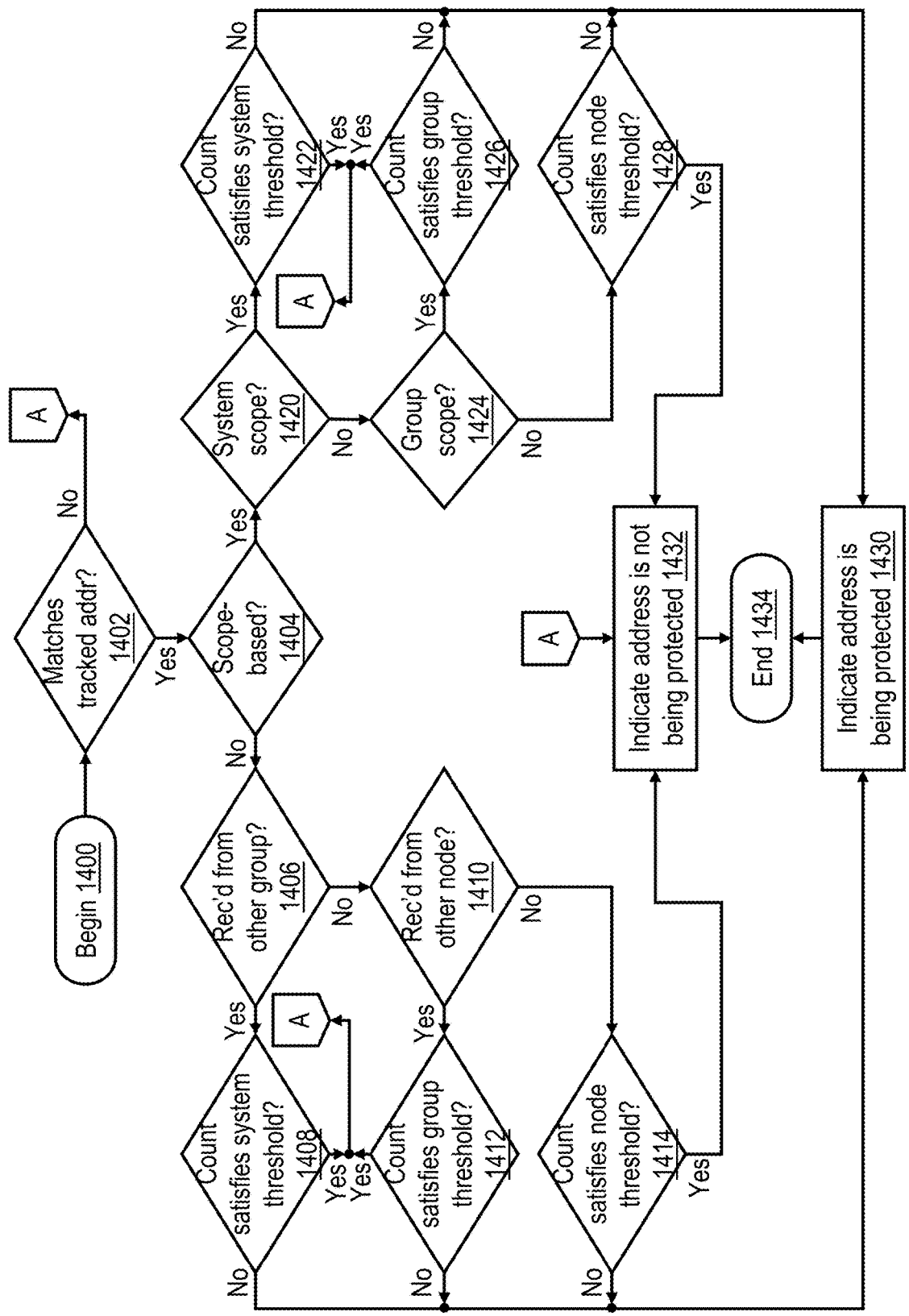
FIG. 14 is a high-level logical flowchart of an exemplary method of determining whether a target address of a snooped request is being protected in accordance with one embodiment.

Referring now to FIG. 14, there is depicted a high-level logical flowchart of an exemplary method by which the L2 cache 130 of a processing unit 102 determines whether or not the target address of request snooped on system interconnect 104 is currently being protected by a protection window extension. The illustrated process is concurrently performed at each address tracked by a reservation register (in the embodiment of FIG. 4A) or by a entry in history buffer 170 (in the embodiment of FIG. 4B) for which the associated B flag 152 is set. The results of all of these parallel processes are logically combined (e.g., ORed) to make the determinations of whether or not the target address of a snooped request is being protected at blocks 1306 and 1318 of FIG. 13.

The process of FIG. 14 begins at block 1400 and then proceeds to block 1402, which illustrates L2 cache 130 determining whether or not the target address of a memory access request snooped on system interconnect 104 matches the address currently buffered in the RSV address field 148 or address register 172 associated with a particular B flag 152 that is set. If not, the process of FIG. 14 passes through page connector A to block 1432, which is described below.

In response to an affirmative determination at block 1402, the process proceeds to block 1404, which illustrates L2 cache 130 determining whether or not L2 cache 130 is configured (e.g., in its design or by an unillustrated configuration register) to base the duration of a protection window extension to which a snooped request is subject on the broadcast scope of the request snooped on system interconnect 104, or alternatively, on the relative location of the master (source) of the snooped request to the snooping L2 cache 130. In response to a determination at block 104 that L2 cache 130 is configured to determine the duration of a protection window extension based on the relative location of the master of the snooped request, the process proceeds to block 1406 and following blocks. If, however, L2 cache 130 is configured to determine the duration of a protection window extension based on the broadcast scope of the snooped request, the process proceeds to block 1420 and following blocks. As discussed below, if a scope-based configuration is employed, requests of greater broadcast scope (e.g., system scope) can be subject to the shorter durations of protection window extensions, and requests of lesser broadcast scope (e.g., node scope) can be subject to longer durations of protection window extensions, regardless of the relative location of the master of the snooped request to a snooping processing unit 102.

Referring now block 1406 and following blocks, L2 cache 130 determines at block 1406 whether or not the snooped request was received from another node group, meaning that the master of the snooped request is within a different node group than the snooping L2 cache 130. L2 cache 130 makes the determination depicted at block 1406 based on the contents of the source field 308 of the snooped request. If a negative determination is made at block 1406, the process passes to block 1410, which is described below. If, however, L2 cache 130 makes an affirmative determination at block 1406, L2 cache 130 further determines at block 1408 whether or not the BL counter 500 of the BL state machine 152 protecting the target address of the snooped request satisfies the system threshold specified by system threshold register 404 (i.e., whether match signal 510 is asserted). If so, the process of FIG. 14 passes through page connector A to block 1432, which is described below. If, however, L2 cache 130 makes a negative determination at block 1408, the process proceeds to block 1430, which is described below.

Referring now to block 1410, L2 cache 130 determines whether or not the snooped request was received from another processing node, meaning that the master of the snooped request, while within the same node group as the snooping L2 cache 130, is within a different processing node. L2 cache 130 makes the determination depicted at block 1410 based on the contents of the source field 308 of the snooped request. If L2 cache 130 makes a negative determination at block 1410, the process passes to block 1414, which is described below. If, however, L2 cache 130 makes an affirmative determination at block 1410, L2 cache 130 further determines at block 1412 whether or not the BL counter 500 of the BL state machine 152 protecting the target address of the snooped request satisfies the group threshold specified by group threshold register 406 (i.e., whether match signal 512 is asserted). If so, the process of FIG. 14 passes through page connector A to block 1432, which is described below. If, however, L2 cache 130 makes a negative determination at block 1412, the process proceeds to block 1430, which is described below.

Referring now to block 1414, based on the determinations at blocks 1406 and 1410 that the master of the snooped request is within the same processing node as the snooping L2 cache 130, L2 cache 130 determines whether or not the BL counter 500 of the BL state machine 152 protecting the target address of the snooped request satisfies the node threshold specified by node threshold register 408 (i.e., whether match signal 514 is asserted). If so, the process of FIG. 14 proceeds to block 1432, which is described below. If, however, L2 cache 130 makes a negative determination at block 1414, the process proceeds to block 1430, which is described below.

Referring now to block 1420 and following blocks, L2 cache 130 determines at block 1420 whether or not the snooped request has a system scope of broadcast. In at least some embodiments, L2 cache 130 makes the determination depicted at block 1406 based on the contents of the scope field 310 of the snooped request and/or the logical or physical channel on which the snooped request was received. If L2 cache 130 makes a negative determination at block 1420, the process passes to block 1424, which is described below. If, however, L2 cache 130 makes an affirmative determination at block 1420, L2 cache 130 further determines at block 1422 whether or not the BL counter 500 of the BL state machine 152 protecting the target address of the snooped request satisfies the system threshold specified by system threshold register 404 (i.e., whether match signal 510 is asserted). If so, the process of FIG. 14 passes through page connector A to block 1432, which is described below. If, however, L2 cache 130 makes a negative determination at block 1422, the process passes to block 1430, which is described below.

Referring now to block 1424, L2 cache 130 determines whether or not the snooped request has a group scope of broadcast. L2 cache 130 makes the determination depicted at block 1424, for example, based on the contents of the scope field 310 of the snooped request and/or the logical or physical channel on which the snooped request was received. If L2 cache 130 makes a negative determination at block 1424, the process passes to block 1428, which is described below. If, however, L2 cache 130 makes an affirmative determination at block 1424, L2 cache 130 further determines at block 1426 whether or not the BL counter 500 of the BL state machine 152 protecting the target address of the snooped request satisfies the group threshold specified by group threshold register 406 (i.e., whether match signal 512 is asserted). If so, the process of FIG. 14 passes through page connector A to block 1432, which is described below. If, however, L2 cache 130 makes a negative determination at block 1426, the process proceeds to block 1430, which is described below.

Referring now to block 1428, based on the determinations at blocks 1420 and 1424 that the snooped request has a node scope of broadcast, L2 cache 130 determines whether or not the BL counter 500 of the BL state machine 152 protecting the target address of the snooped request satisfies the node threshold specified by node threshold register 408 (i.e., whether match signal 514 is asserted). If so, the process of FIG. 14 proceeds to block 1432, which illustrates reservation logic 146 providing an indication that the target address of the snooped request is not being protected by a protection window extension applied by L2 cache 130. In one embodiment, this indication can be provided by non-assertion of a signal generated by ORing the match signals 510-514 of a given BL state machine 154. If, however, L2 cache 130 makes a negative determination at block 1428, the process proceeds to block 1430, which illustrates L2 cache 130 providing an indication that the target address of the snooped request is being protected by a protection window extension provided by one of BL state machines 154. In one embodiment, this indication can be provided by assertion of a signal generated by ORing the match signals 510-514 of a given BL state machine 154. Following block 1430 or block 1432, the process of FIG. 14 ends at block 1434. Based on the protected/not protected indications generated by the concurrent instances of the process of FIG. 14, reservation logic 146 can determine at blocks 1306 and 1318 of FIG. 13 whether or not the target address of a snooped request is being protected, for example, by logically combining (e.g., ORing) all of the individual protected/not protected indications.

Figure 15:
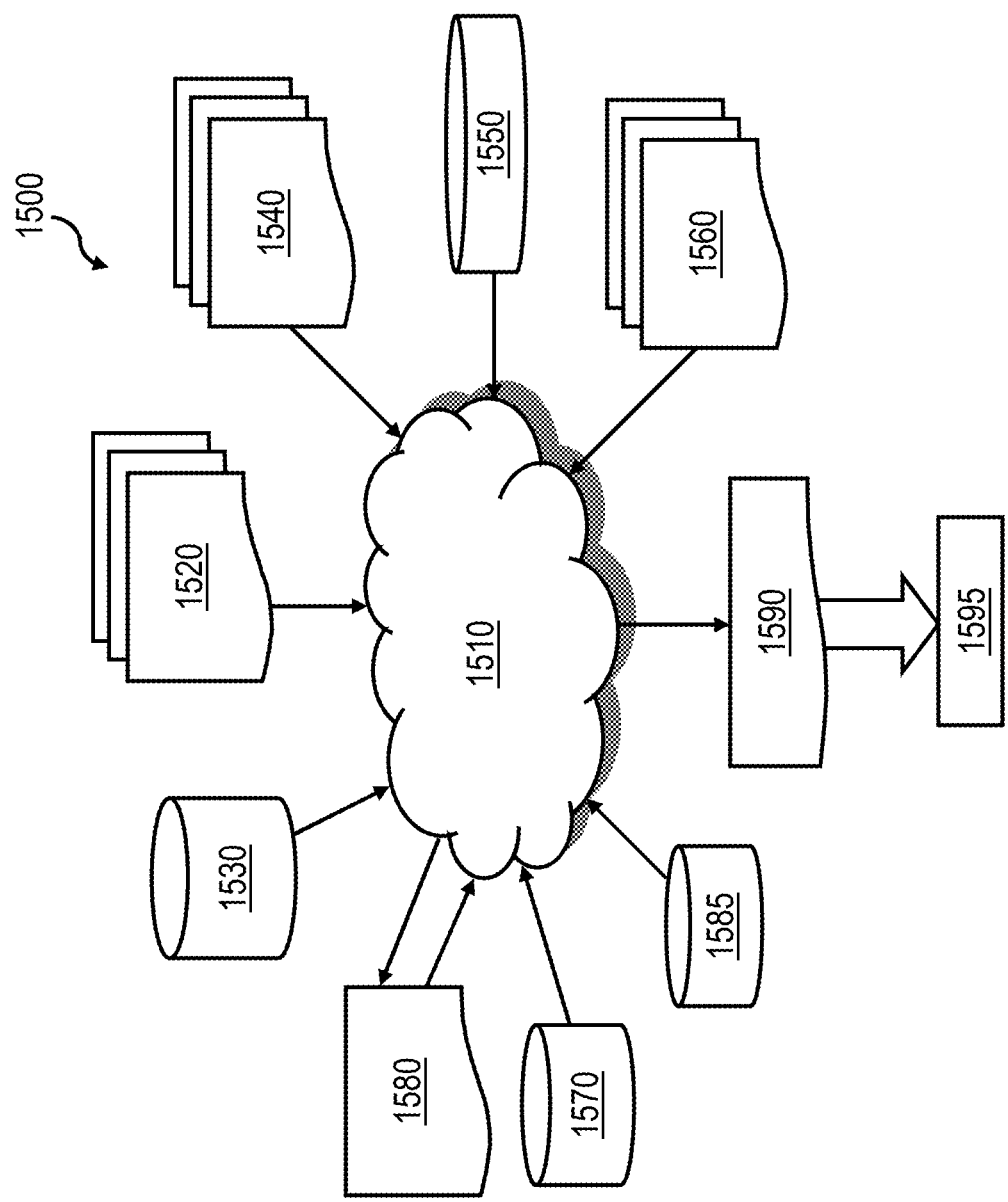
FIG. 15 is a block diagram of an exemplary design flow.

With reference now to FIG. 15, there is illustrated a block diagram of an exemplary design flow 1500 used for example, in semiconductor IC logic design, simulation, test, layout, and manufacture. Design flow 1500 includes processes, machines and/or mechanisms for processing design structures or devices to generate logically or otherwise functionally equivalent representations of the design structures and/or devices described above and shown herein. The design structures processed and/or generated by design flow 1500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1500 may vary depending on the type of representation being designed. For example, a design flow 1500 for building an application specific IC (ASIC) may differ from a design flow 1500 for designing a standard component or from a design flow 1500 for instantiating the design into a programmable array, for example a programmable gate array (PGA) or a field programmable gate array (FPGA) offered by Altera® Inc. or Xilinx® Inc.

FIG. 15 illustrates multiple such design structures including an input design structure 1520 that is preferably processed by a design process 1510. Design structure 1520 may be a logical simulation design structure generated and processed by design process 1510 to produce a logically equivalent functional representation of a hardware device. Design structure 1520 may also or alternatively comprise data and/or program instructions that when processed by design process 1510, generate a functional representation of the physical structure of a hardware device. Whether representing functional and/or structural design features, design structure 1520 may be generated using electronic computer-aided design (ECAD) such as implemented by a core developer/designer. When encoded on a machine-readable data transmission, gate array, or storage medium, design structure 1520 may be accessed and processed by one or more hardware and/or software modules within design process 1510 to simulate or otherwise functionally represent an electronic component, circuit, electronic or logic module, apparatus, device, or system such as those shown herein. As such, design structure 1520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1510 preferably employs and incorporates hardware and/or software modules for synthesizing, translating, or otherwise processing a design/simulation functional equivalent of the components, circuits, devices, or logic structures shown herein to generate a netlist 1580 which may contain design structures such as design structure 1520. Netlist 1580 may comprise, for example, compiled or otherwise processed data structures representing a list of wires, discrete components, logic gates, control circuits, PO devices, models, etc. that describes the connections to other elements and circuits in an integrated circuit design. Netlist 1580 may be synthesized using an iterative process in which netlist 1580 is resynthesized one or more times depending on design specifications and parameters for the device. As with other design structure types described herein, netlist 1580 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1510 may include hardware and software modules for processing a variety of input data structure types including netlist 1580. Such data structure types may reside, for example, within library elements 1530 and include a set of commonly used elements, circuits, and devices, including models, layouts, and symbolic representations, for a given manufacturing technology (e.g., different technology nodes, 32 nm, 45 nm, 100 nm, etc.). The data structure types may further include design specifications 1540, characterization data 1550, verification data 1560, design rules 1590, and test data files 1585 which may include input test patterns, output test results, and other testing information. Design process 1510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1510 without deviating from the scope and spirit of the invention. Design process 1510 may also include modules for performing standard circuit design processes such as timing analysis, verification, design rule checking, place and route operations, etc.

Design process 1510 employs and incorporates logic and physical design tools such as HDL compilers and simulation model build tools to process design structure 1520 together with some or all of the depicted supporting data structures along with any additional mechanical design or data (if applicable), to generate a second design structure 1590. Design structure 1590 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 1520, design structure 1590 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1590 may comprise a compiled, executable HDL simulation model that functionally simulates the devices shown herein.

Design structure 1590 may also employ a data format used for the exchange of layout data of integrated circuits and/or symbolic data format (e.g., information stored in a GDSII (GDS2), GL1, OASIS, map files, or any other suitable format for storing such design data structures). Design structure 1590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1590 may then proceed to a stage 1595 where, for example, design structure 1590: proceeds to tape-out, is released to manufacturing, is released to a mask house, is sent to another design house, is sent back to the customer, etc.

As has been described, in at least one embodiment, a data processing system includes multiple processing units all communicably coupled to a shared memory via a system interconnect. A processing unit includes a processor core that executes memory access instructions including a store-conditional instruction that generates a store-conditional request specifying a store target address and store data. The processing unit further includes a reservation register that records shared memory addresses for which the processor core has obtained reservations and a cache that services the store-conditional request by conditionally updating the shared memory with the store data based on the reservation register indicating a reservation for the store target address. The cache includes a blocking state machine configured to protect the store target address against access by any conflicting memory access request snooped on the system interconnect during a protection window extension following servicing of the store-conditional request. The cache is configured to vary a duration of the protection window extension for different snooped memory access requests based on one of broadcast scopes of the snooped memory access requests on the system interconnect and locations of masters of the snooped memory access requests relative to the processing unit.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including multiple processing units all communicably coupled to a shared system memory via a system interconnect, said processing unit comprising:
    a processor core that executes memory access instructions including a store-conditional instruction, wherein execution of the store-conditional instruction generates a store-conditional request that specifies a store target address and store data;
    a reservation register that records shared memory addresses for which the processor core has obtained reservations; and
    a cache that services the store-conditional request by conditionally updating the shared memory with the store data based on the reservation register indicating a reservation for the store target address, wherein the cache includes a state machine configured to protect the store target address against access by any conflicting memory access request snooped on the system interconnect during a protection window extension following servicing of the store-conditional request, wherein the cache is configured to vary a duration of the protection window extension for different snooped memory access requests based on one of broadcast scopes of the snooped memory access requests on the system interconnect and locations of masters of the snooped memory access requests relative to the processing unit.

2. The processing unit of claim 1, and further comprising a blocking timer that determines a maximum duration of the protection window extension.

3. The processing unit of claim 1, wherein the blocking state machine is configured to end the protection window extension responsive to receipt by the cache of a new load-reserve request from the processor core.

4. The processing unit of claim 1, and further comprising reservation management logic that controls a maximum duration for which the processing unit can provide a protection window extension for any store target address.

5. The processing unit of claim 1, and further comprising reservation management logic that intermittently inhibits the processing unit from providing a protection window extension for any store target address.

6. The processing unit of claim 1, wherein:
the reservation logic further includes a history buffer that records prior store target addresses successfully updated by store-conditional requests of the processor core; and
the blocking state machine provides the protection window extension based on the store target address matching a prior store target address in history buffer.

7. The processing unit of claim 1, wherein the cache is configured to apply a protection window extension of shorter duration for snooped memory access requests of systemwide broadcast scope and a protection window extension of longer duration for snooped memory access requests of lesser broadcast scope.

8. The processing unit of claim 1, wherein the multiple processing units are grouped in multiple disjoint processing nodes, and wherein the cache is configured to apply a protection window extension of shorter duration for snooped memory access requests of masters disposed in a different processing node than the processing unit and a protection window extension of longer duration for memory access requests of masters in a same processing node as the processing unit.

9. A data processing system, comprising:
the multiple processing units, including the processing unit of claim 1;
the shared memory; and
the system interconnect communicatively coupling the shared memory and the multiple processing units.

10. A method of data processing in a processing unit of a data processing system including multiple processing units all having access to a shared memory, said method comprising:
a processor core of the processing unit executing memory access instructions including a store-conditional instruction, wherein execution of the store-conditional instruction generates a store-conditional request that specifies a store target address and store data;
a reservation register recording shared memory addresses for which the processor core has obtained reservations;
a cache servicing the store-conditional request by conditionally updating the shared memory with the store data based on the reservation register indicating a reservation for the store target address; and
a state machine protecting the store target address against access by any conflicting memory access request during a protection window extension following servicing of the store-conditional request, wherein the state machine varies a duration of the protection window extension for different snooped memory access requests based on one of broadcast scopes of the snooped memory access requests on the system interconnect and locations of masters of the snooped memory access requests relative to the processing unit.

11. The method of claim 10, and further comprising determining a maximum duration of the protection window extension by reference to a blocking timer.

12. The method of claim 10, and further comprising the blocking state machine ending the protection window extension responsive to receipt by the cache of a new load-reserve request from the processor core.

13. The method of claim 10, and further comprising controlling a maximum duration for which the processing unit can provide a protection window extension for any store target address.

14. The method of claim 10, and further comprising intermittently inhibiting the processing unit from providing a protection window extension for any store target address.

15. The method of claim 10, wherein:
the method further comprises recording, in a history buffer, prior store target addresses successfully updated by store-conditional requests of the processor core; and
the protecting includes the blocking state machine providing the protection window extension based on the store target address matching a prior store target address in history buffer.

16. The method of claim 10, wherein the protecting includes applying a protection window extension of shorter duration for snooped memory access requests of systemwide broadcast scope and a protection window extension of longer duration for snooped memory access requests of lesser broadcast scope.

17. The method of claim 10, wherein the multiple processing units are grouped in multiple disjoint processing nodes, and wherein the protecting includes apply a protection window extension of shorter duration for snooped memory access requests of masters disposed in a different processing node than the processing unit and a protection window extension of longer duration for memory access requests of masters in a same processing node as the processing unit.

\* \* \* \* \*